US011667385B2

(12) United States Patent
Dobberfuhl et al.

(10) Patent No.: US 11,667,385 B2
(45) Date of Patent: Jun. 6, 2023

(54) CARGO LOADING SYSTEM FOR AN AIRCRAFT AND METHOD OF OPERATING SAME

(71) Applicant: THE BOEING COMPANY, Chicago, IL (US)

(72) Inventors: James Philip Dobberfuhl, Clinton, WA (US); Max Urban Kismarton, Renton, WA (US)

(73) Assignee: THE BOEING COMPANY, Chicago, IL (US)

(*) Notice: Subject to any disclaimer, the term of this patent is extended or adjusted under 35 U.S.C. 154(b) by 752 days.

(21) Appl. No.: 16/238,047

(22) Filed: Jan. 2, 2019

(65) Prior Publication Data
US 2020/0207475 A1    Jul. 2, 2020

(51) Int. Cl.
   *B64D 9/00* (2006.01)
   *B65G 67/00* (2006.01)

(52) U.S. Cl.
   CPC .............. *B64D 9/00* (2013.01); *B65G 67/00* (2013.01); *B64D 2009/006* (2013.01)

(58) Field of Classification Search
   CPC .... B64D 9/00; B64D 2009/006; B64D 9/003; B65G 67/00; B64C 1/22
   See application file for complete search history.

(56) References Cited

U.S. PATENT DOCUMENTS

| | | | | |
|---|---|---|---|---|
| 4,000,870 A * | 1/1977 | Davies | ...................... | B64C 1/20 |
| | | | | 410/94 |
| 4,077,590 A * | 3/1978 | Shorey | ................... | B64D 9/003 |
| | | | | 414/532 |
| 4,165,810 A * | 8/1979 | Young | ...................... | B64C 1/22 |
| | | | | 187/241 |
| 4,416,579 A * | 11/1983 | Alberti | ...................... | B64C 1/20 |
| | | | | 410/94 |
| 5,076,515 A * | 12/1991 | Goon | ....................... | B64D 9/00 |
| | | | | 414/471 |
| 6,808,142 B2 * | 10/2004 | Oki | .......................... | B64C 1/20 |
| | | | | 244/137.1 |
| 8,066,458 B2 * | 11/2011 | Schulze | .................... | B64C 1/20 |
| | | | | 410/80 |
| 9,139,283 B1 | 9/2015 | Campbell et al. | | |
| 9,205,910 B1 | 12/2015 | Campbell et al. | | |
| 9,758,180 B2 * | 9/2017 | Sun | ........................ | B61D 45/00 |
| 10,583,988 B1 * | 3/2020 | Zeidner | ............... | B65G 13/065 |
| 2005/0008443 A1 * | 1/2005 | Eitzenberger | ............. | B60P 7/13 |
| | | | | 410/94 |

* cited by examiner

*Primary Examiner* — Richard Green
*Assistant Examiner* — Steven J Shur
(74) *Attorney, Agent, or Firm* — Jordan IP Law, LLC

(57) ABSTRACT

A cargo loading system includes a drive unit extending along a length of a cargo area of an aircraft. The drive unit is configured to couple to a modular cargo structure via a handling member and to convey one or more cargo items coupled to the modular cargo structure. The cargo loading system further includes a rotation device and a driver. The rotation device is in contact with the drive unit. The driver is configured to apply torque to the rotation device to cause the drive unit to move the modular cargo structure within the aircraft.

20 Claims, 20 Drawing Sheets

CARGO LOADING SYSTEM FOR AN AIRCRAFT AND METHOD OF OPERATING SAME

FIELD OF THE DISCLOSURE

The present disclosure is generally related to cargo loading systems for aircraft.

BACKGROUND

Vehicles are used to transport cargo, such as equipment, materials, merchandise, and other articles. Cargo vehicles include aircraft, ships, cars, trucks, and other vehicles.

In some cases, transportation by aircraft is faster than transportation by other vehicles. For example, cargo can be transported between continents in a matter of hours using an aircraft.

In some circumstances, transportation of cargo using an aircraft is expensive or inconvenient. For example, to transport cargo by an aircraft, the cargo is generally arranged in the aircraft in a certain fashion, such as by securing the cargo within the aircraft to reduce or avoid cargo damage due to turbulence. In some cases, loading of cargo into an aircraft and securing the cargo into the aircraft can be time consuming.

SUMMARY

In a particular example, a cargo loading system includes a drive unit extending along a length of a cargo area of an aircraft. The drive unit is configured to couple to a modular cargo structure via a handling member and to convey one or more cargo items coupled to the modular cargo structure. The cargo loading system further includes a rotation device and a driver. The rotation device is in contact with the drive unit. The driver is configured to apply torque to the rotation device to cause the drive unit to move the modular cargo structure within the aircraft.

In another particular example, a method of cargo loading of an aircraft includes activating a driver of a cargo loading system. The cargo loading system includes a drive unit extending along a length of a cargo area of an aircraft. The drive unit is removably coupled to a modular cargo structure via a handling member. The method further includes applying torque, using the driver, to a rotation device of the cargo loading system to cause the drive unit to move the modular cargo structure within the aircraft. The method further includes receiving, within the aircraft via the drive unit, one or more cargo items coupled to the modular cargo structure.

In another particular example, a method of unloading cargo from an aircraft includes activating a driver of a cargo loading system. The cargo loading system includes a drive unit extending along a length of a cargo area of an aircraft. The drive unit is removably coupled to a modular cargo structure via a handling member. The method further includes applying torque, using the driver, to a rotation device of the cargo loading system to cause the drive unit to move the modular cargo structure within the aircraft. The method further includes providing, from the aircraft to a cargo platform via the drive unit, one or more cargo items coupled to the modular cargo structure.

DETAILED DESCRIPTION

In a particular implementation, an aircraft includes a modular structure (e.g., one or more modular floors of the aircraft) and a cargo loading system configured to remove the modular structure from the aircraft. In one example, upon removing the modular structure from the aircraft, the modular structure is loaded with cargo and returned to the aircraft using the cargo loading system. In one example, to unload the cargo from the aircraft (e.g., after the aircraft lands at a destination), the modular structure is removed from the aircraft using the cargo loading system and unloaded of the cargo.

In some examples, loading and unloading cargo from the modular structure outside of the aircraft reduces or avoids the need for personnel to enter the aircraft. For example, in some cases, the modular structure is configured to automatically secure to an airframe of the aircraft (e.g., using one or more locking mechanisms, such as one or more plunger lock pin devices). As a result, in some implementations, the cargo (and the modular structure) are secured to the aircraft in an automated manner (e.g., without personnel entering the aircraft to physically secure the cargo to the aircraft). In some circumstances, securing cargo to the modular structure outside of the aircraft is faster or more convenient than entering the aircraft to load and secure the cargo to the aircraft. For example, in some cases, multiple modular floors of the aircraft can be simultaneously loaded (or unloaded) outside the aircraft.

Further, in some examples, one or more aspects of the disclosure enable reduction of energy consumption (e.g., fuel consumption) by an aircraft. To illustrate, by reducing or avoiding the need for personnel to enter the aircraft to secure cargo, a size (e.g., diameter) of a fuselage of the aircraft can be reduced. In this particular example, air drag and fuel consumption are reduced.

Figure 1A:
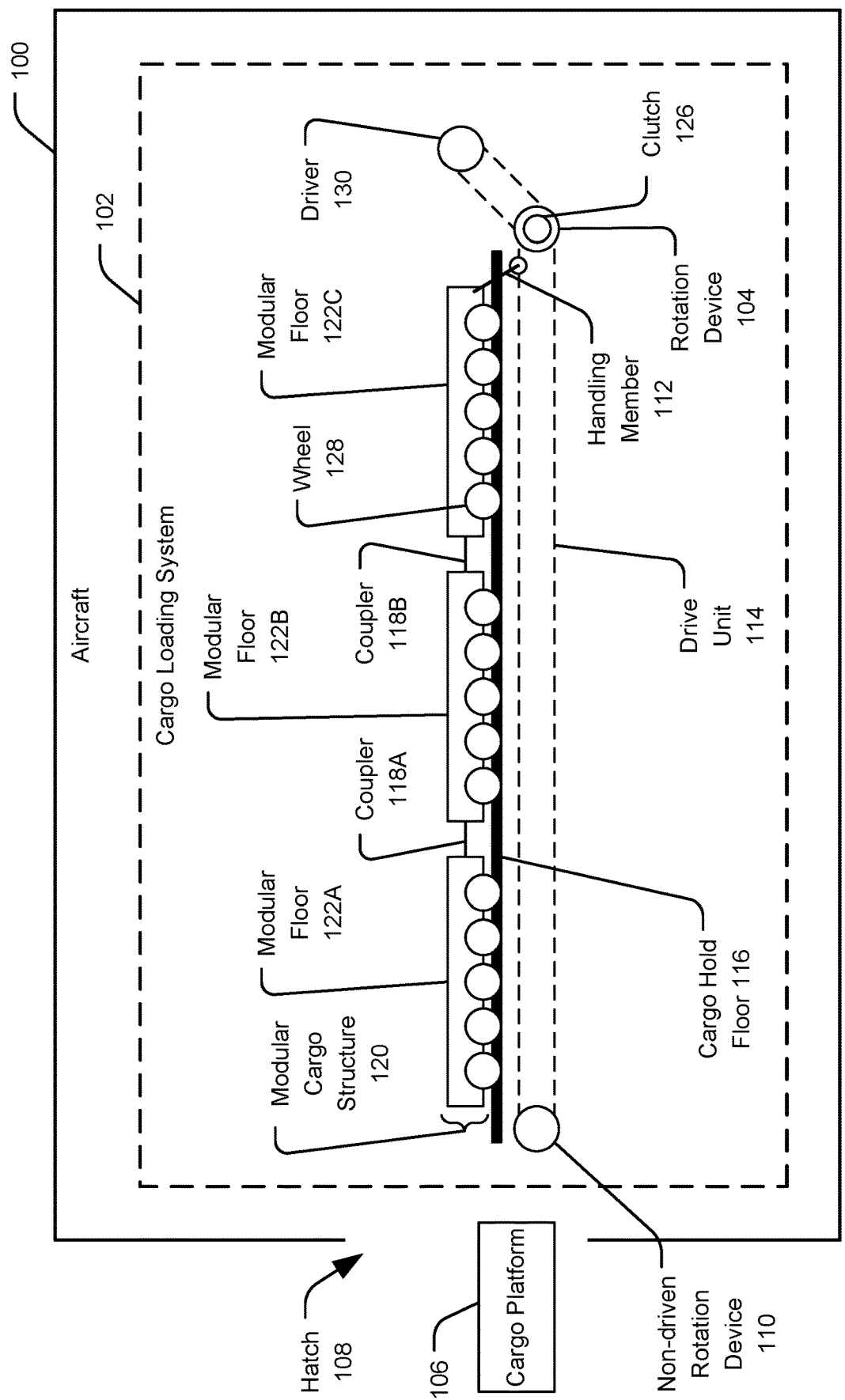
FIG. 1A is a diagram illustrating certain aspects of an example of an aircraft that includes a cargo loading system.

Referring to FIG. 1A, a particular illustrative example of the cargo loading system is depicted and generally designated 102. The cargo loading system 102 is included in an aircraft 100 (e.g., a freight aircraft or another aircraft). FIG. 1A also illustrates a cargo platform 106.

The cargo loading system 102 includes a modular cargo structure 120. In some implementations, the modular cargo structure 120 includes one or more structural components of the aircraft 100. In one example, the modular cargo structure 120 includes a modular floor of the aircraft 100, such as a modular floor 122A. In some implementations, the modular cargo structure 120 includes a plurality of modular floors of the aircraft 100. To illustrate, in FIG. 1A, the modular cargo structure 120 includes the modular floor 122A, a modular floor 122B, and a modular floor 122C. In other implementations, the modular cargo structure 120 can include a different number of modular floors.

In some implementations, the cargo loading system 102 includes a cargo hold floor 116. In some examples, one or more modular floors of the modular cargo structure 120 are in contact with the cargo hold floor 116. For example, in FIG. 1, each modular floor of the modular cargo structure 120 include a plurality of wheels (e.g., a representative wheel 128) configured to roll the modular floor across the cargo hold floor 116. In other implementations, other devices may be used alternatively or in addition to wheels. For example, in some implementations, a rail system is implemented (e.g., where each modular floor of the modular cargo structure 120 attaches to a rail of the cargo hold floor 116).

The cargo loading system 102 includes a drive unit 114. In some implementations, the drive unit 114 includes a serpentine belt, a chain, or a cable. The drive unit 114 extends along a length of a cargo area of the aircraft 100. For example, the drive unit 114 may extend from a nose of the aircraft 100 (or near to the nose of the aircraft 100) to a tail of the aircraft 100 (or near the tail of the aircraft 100).

The drive unit 114 is configured to couple to the modular cargo structure 120 via a handling member 112 (e.g., a flexible leash or a rigid bar). To illustrate, in FIG. 1A, the drive unit 114 is configured to couple to the modular floor 122C via the handling member 112.

In the particular example of FIG. 1A, the modular cargo structure 120 includes a plurality of modular floors having a daisy chained configuration (where each modular floor is attached to another modular floor). In this example, a single handling member 112 can be used (e.g., where the modular floor 122C is configured to pull or push the modular floors 122A, 122B). For example, in FIG. 1A, the handling member 112 is coupled to an end modular floor (the modular floor 122C) of the plurality of modular floors. Alternatively, in some examples, multiple handling members 112 are used to attach modular floors of the cargo loading system 102 to the drive unit 114.

In some implementations, each modular floor of the cargo loading system 102 is coupled to one or more other modular floors of the cargo loading system 102. For example, in FIG. 1A, the modular floor 122A is coupled to the modular floor 122B via a coupler 118A. As another example, FIG. 1A illustrates that the modular floor 122B is coupled to the modular floor 122C via a coupler 118B. Depending on the particular example, the couplers 118A, 118B can include a retention mechanism, such as a buffer-and-chain retention mechanism, a link-and-pin retention mechanism, a knuckle retention mechanism, one or more other retention mechanisms, or a combination thereof. In a particular example, the couplers 118A, 118B include a visual indicator of whether the couplers 118A, 118B are engaged or disengaged, whether the couplers 118A, 118B are locked or unlocked, or both.

Although the example of FIG. 1A depicts one handling member 112, in other implementations, the cargo loading system 102 includes more than one handling member 112. In a particular example, each modular floor of the modular cargo structure 120 includes a respective handling member 112 that is attached to the particular modular floor and to the drive unit 114.

The cargo loading system 102 further includes a rotation device 104 in contact with the drive unit 114. In some implementations, the rotation device 104 includes a pulley, a cog, or a cable drum. In a particular example, the rotation device 104 includes or is coupled to a clutch 126 that is in contact with the drive unit 114. In some implementations, the clutch 126 is coupled to the driver 130.

The cargo loading system 102 further includes a driver 130 configured to convey one or more cargo items coupled to the modular cargo structure 120. In some implementations, the driver 130 includes an electric motor or a hydraulic motor.

In FIG. 1A, the cargo loading system 102 further includes a non-driven rotation device 110. The non-driven rotation device 110 is in contact with the drive unit 114. In some implementations, the non-driven rotation device 110 includes a pulley, a cog, or a cable drum. In a particular example, the rotation device 104 is in contact with the drive unit 114 at a first end of a cargo area of the aircraft 100 (e.g., near the nose or tail of the aircraft 100), and the non-driven rotation device 110 is in contact with the drive unit 114 at a second end of the cargo area (e.g., near the tail or nose of the aircraft 100).

In a particular example, the rotation device 104 includes or is coupled to a clutch 126 that is in contact with the drive unit 114. In some implementations, the clutch 126 is configured to disengage the driver 130 from the drive unit 114 in response to a failure condition during loading of the modular cargo structure into the aircraft, during unloading of the modular cargo structure from the aircraft, or both. To illustrate, in certain failure conditions, motion of the drive unit 114 can stop unintentionally (e.g., due to an object blocking movement of the drive unit 114) during operation. In this case, the clutch 126 is configured to disengage the driver 130 from the drive unit 114 (e.g., by "slipping" a mechanical connection between the driver 130 and the drive unit 114).

In some examples, the aircraft 100 includes a hatch 108 that is included in or adjacent to the cargo loading system 102. In some implementations, the aircraft 100 is configured to open the hatch 108 to enable loading of cargo to and unloading of cargo from the cargo platform 106. In some implementations, the hatch 108 is a front hatch (where the hatch 108 is located near the nose of the aircraft 100). In other examples, the hatch 108 has a different configuration, such as where the hatch 108 is a rear hatch (near the tail of the aircraft 100) or a side hatch (near the side of the aircraft 100).

During operation, the driver 130 is configured to apply torque to the rotation device 104 to cause the drive unit 114 to move the modular cargo structure 120 within the aircraft 100, and the drive unit 114 is configured to convey one or more cargo items coupled to the modular cargo structure 120.

In some implementations, the cargo loading system 102 includes a controller coupled to the driver 130. In a particular example, the controller is configured to selectively activate and deactivate the driver 130 (e.g., to start or stop application of torque to the rotation device 104). In some implementations, the controller is configured to determine a direction of torque applied to the rotation device 104 (e.g., by applying torque in a clockwise direction in FIG. 1A to move the modular cargo structure 120 into the aircraft 100, or by applying torque in a counterclockwise direction in FIG. 1A to move the modular cargo structure 120 out of the aircraft 100, as illustrative examples).

In some implementations, one or more modular floors of the modular cargo structure 120 include a switch. In a particular example, an end modular floor of the modular cargo structure 120 includes a switch (e.g., a limit switch or a proximity switch). In some implementations, the switch is configured to detect presence or absence of modular floors of the modular cargo structure 120 within the aircraft 100. To illustrate, in one example, the switch is configured to deactivate the driver 130 (or to send a signal to a controller to cause the controller to deactivate the driver 130) in response to unloading or loading of a threshold number of modular floors of the modular cargo structure 120 into the aircraft 100. As a particular illustrative example, in FIG. 1A, the modular cargo structure 120 includes three modular floors. In this particular example, the switch can be configured to deactivate the driver 130 in response to unloading or loading of three modular floors into the aircraft 100.

Figure 1B:
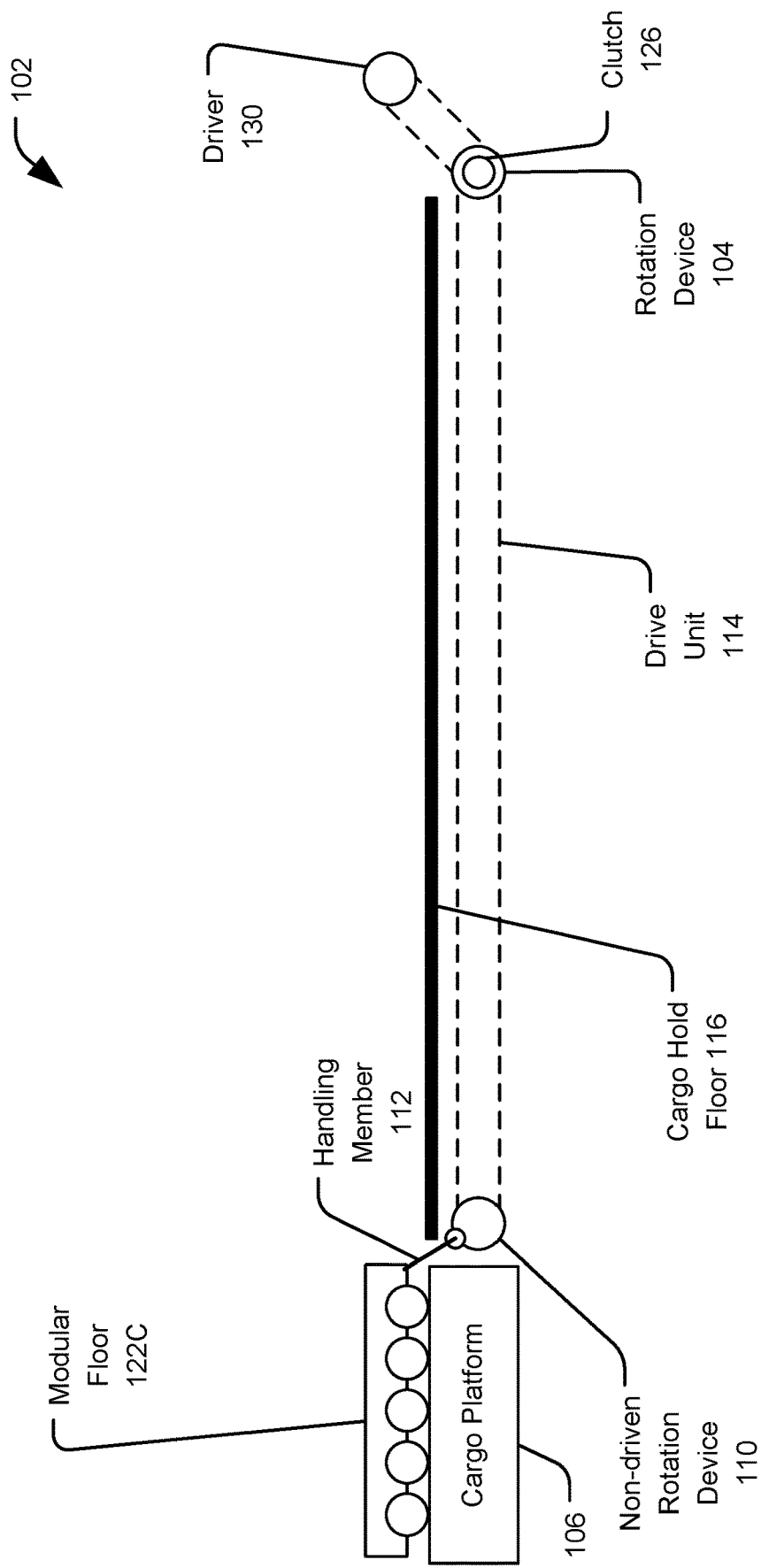
FIG. 1B is another diagram illustrating certain aspects of an example of the cargo loading system of FIG. 1A.

FIG. 1B depicts additional illustrative aspects of the cargo loading system 102. In FIG. 1B, the modular cargo structure 120 is removed from the aircraft 100 to the cargo platform 106 using the drive unit 114. Depending on the particular implementation, modular floors of the modular cargo structure 120 can be removed consecutively, simultaneously, or using another technique (e.g., in pairs or groups of three, etc.). In a particular example, modular floors of the modular cargo structure 120 have a daisy chained configuration, and the modular floors are removed from the aircraft 100 consecutively (e.g., by removing the modular floor 122A, then removing the modular floor 122B, and then removing the modular floor 122C).

Although FIG. 1B illustrates a single modular floor 122C for convenience of illustration, it should be appreciated that other modular floors of the modular cargo structure 120 can be removed from the aircraft 100 to the cargo platform 106. For example, the modular floors 122A, 122B can be removed from the aircraft 100 to the cargo platform 106 using the drive unit 114.

In some examples, the cargo 140 is loaded to the modular floor 122C using a vehicle (e.g., a forklift), a mechanical cargo loading system, personnel, or both. Although FIG. 1B illustrates a single modular floor 122C for convenience of illustration, it should be appreciated that other modular floors of the modular cargo structure 120 can be loaded with cargo. For example, the modular floors 122A, 122B can be loaded with cargo on the cargo platform, as shown with reference to the modular floor 122C and the cargo 140.

Figure 1C:
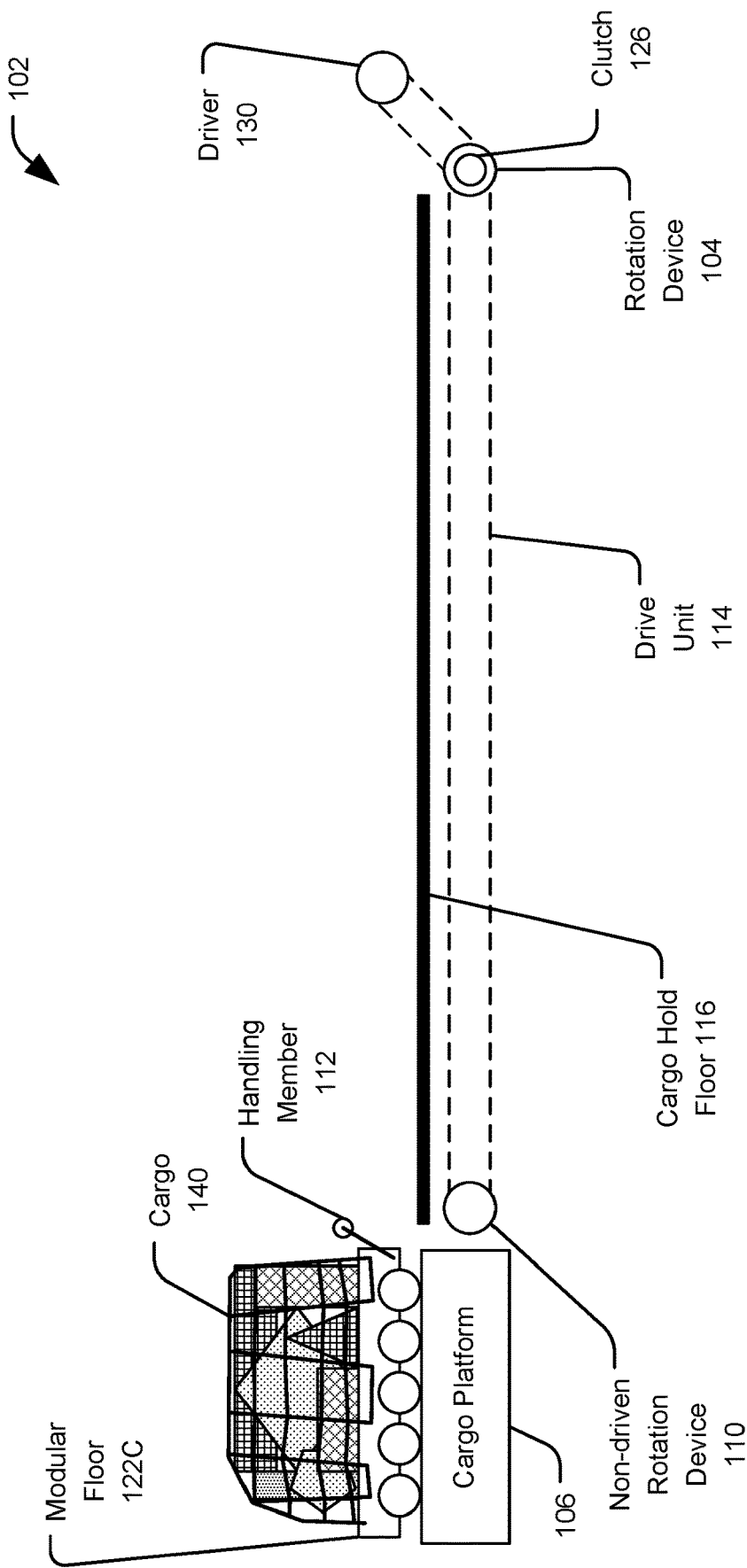
FIG. 1C is another diagram illustrating certain aspects of an example of the cargo loading system of FIG. 1A.

In FIG. 1C, the modular floor 122C is loaded with cargo 140. In the example of FIG. 1C, the cargo 140 is secured to the modular floor 122C using a cargo net. Alternatively or in addition, one or more other techniques can be used to secure the cargo the modular cargo structure 120. As a particular example, cargo can be loaded into a container, such as described further with reference to FIG. 3.

In some implementations, upon removing the modular floor 122C from the aircraft 100, the handling member 112 is decoupled from the drive unit 114. In some implementations, the handling member 112 is automatically decoupled from the drive unit 114 (e.g., via a spring latch device or other mechanism). In other implementations, the handling member 112 is manually decoupled from the drive unit 114.

Figure 1D:
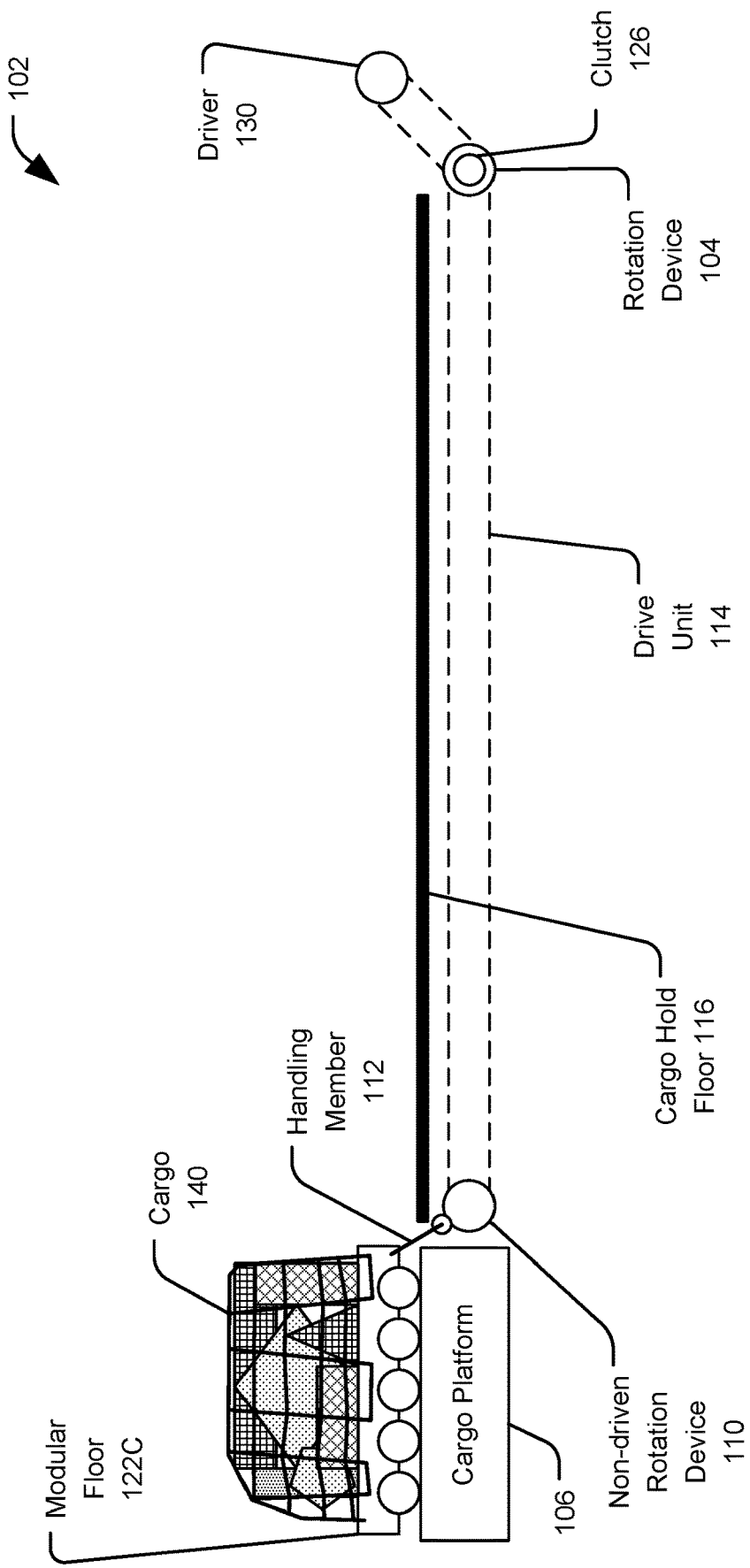
FIG. 1D is another diagram illustrating certain aspects of an example of the cargo loading system of FIG. 1A.

In FIG. 1D, the handling member 112 is coupled to the drive unit 114. In some implementations, the handling member 112 is automatically coupled to the drive unit 114 (e.g., via activation of a spring latch device or other mechanism when the modular cargo structure 120 is pushed onto the cargo hold floor 116). In other implementations, the handling member 112 is manually coupled to the drive unit 114.

Figure 1E:
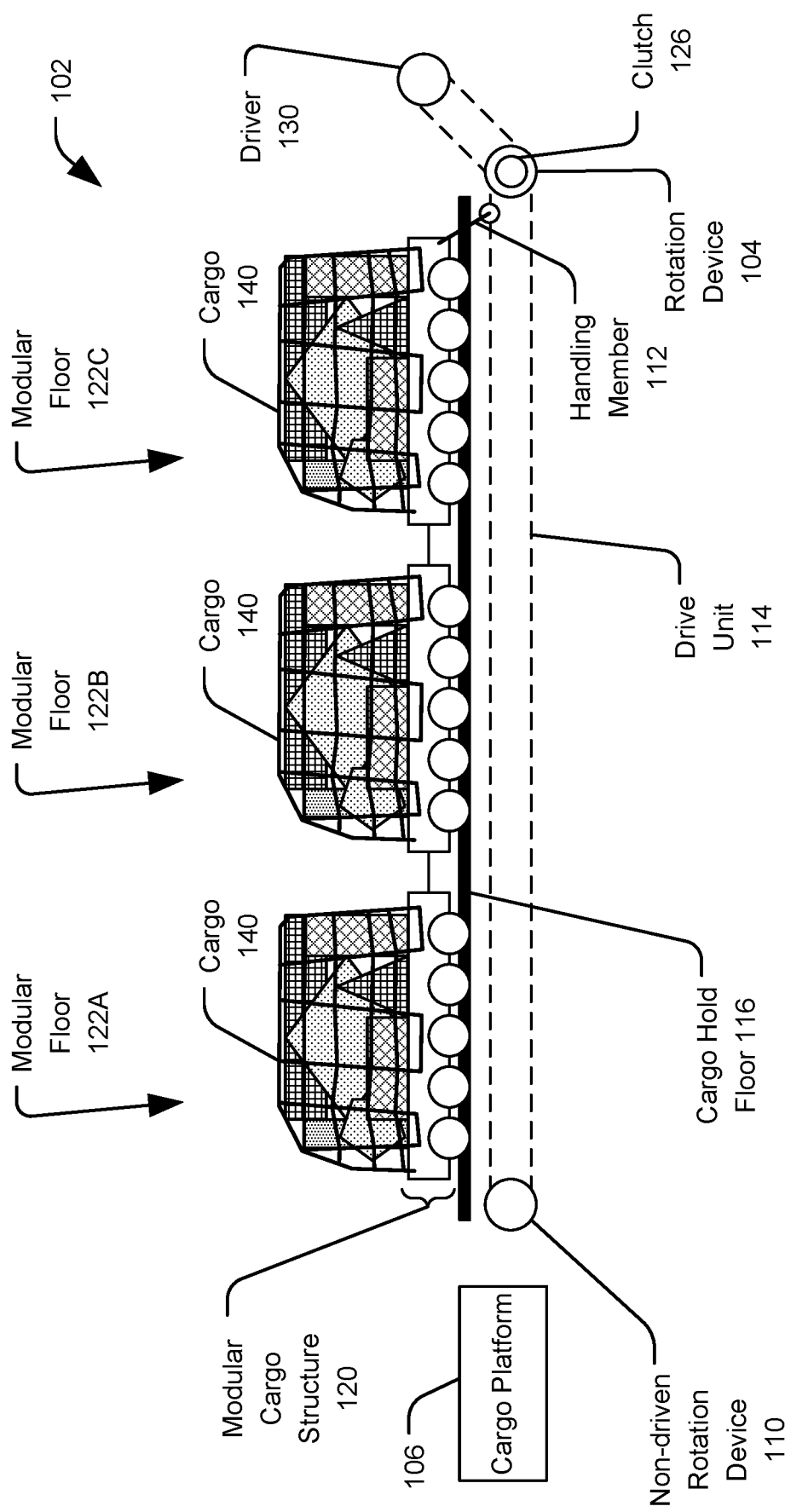
FIG. 1E is another diagram illustrating certain aspects of an example of the cargo loading system of FIG. 1A.

In FIG. 1E, modular floors of the modular cargo structure 120 are loaded into the aircraft 100. Depending on the particular implementation, modular floors of the modular cargo structure 120 can be loaded consecutively, simultaneously, or using another technique (e.g., in pairs or groups of three, etc.). In a particular example, modular floors of the modular cargo structure 120 have a daisy chained configuration, and the modular floors are loaded into the aircraft 100 consecutively (e.g., by loading the modular floor 122C, then loading the modular floor 122B, and then loading the modular floor 122A).

In a particular example, the drive unit 114 conveys the modular cargo structure 120 into the aircraft 100. In some implementations, the driver 130 is activated upon connecting the handling member 112 to the drive unit 114. In some implementations, activation of the driver 130 causes the rotation device 104 to move the drive unit 114 to convey the modular cargo structure 120 into the aircraft 100.

In the example of FIG. 1E, the modular cargo structure 120 includes the modular floors 122A, 122B, and 122C. In FIG. 1E, the modular floors 122A, 122B, and 122C each convey items of the cargo 140.

In some implementations, upon loading the modular floors 122A, 122B, and 122C into the aircraft 100, the handling member 112 is decoupled from the drive unit 114. In some implementations, the driver 130 is deactivated prior to or after decoupling the handling member 112 from the drive unit 114. In some implementations, deactivation of the driver 130 causes the rotation device 104 to cease to move the drive unit 114.

In some implementations, after deactivating the driver 130, the modular cargo structure 120 is secured within the aircraft 100. In some examples, the modular cargo structure 120 is secured within the aircraft 100 by locking each of the modular floors 122A, 122B, and 122C to the cargo hold floor 116.

One or more aspects described with reference to FIGS. 1A-1E can improve efficiency of cargo loading, cargo unloading, or both. To illustrate, in some examples, loading and unloading the cargo 140 from the modular cargo structure 120 outside of the aircraft 100 reduces or avoids the need for personnel to enter the aircraft 100. In some circumstances, securing the cargo 140 to the modular cargo structure 120 outside of the aircraft 100 is faster or more convenient than entering the aircraft 100 to load and secure the cargo 140 to the aircraft 100. For example, in some cases, the modular floors 122A, 122B, and 122C can be simultaneously loaded (or unloaded) outside the aircraft 100.

Further, in some examples, one or more aspects enable reduction of energy consumption (e.g., fuel consumption) by the aircraft 100. To illustrate, by reducing or avoiding the need for personnel to enter the aircraft 100 to secure the cargo 140, a size (e.g., diameter) of a fuselage of the aircraft 100 can be reduced. In this particular example, air drag and fuel burn are reduced.

Figure 2:
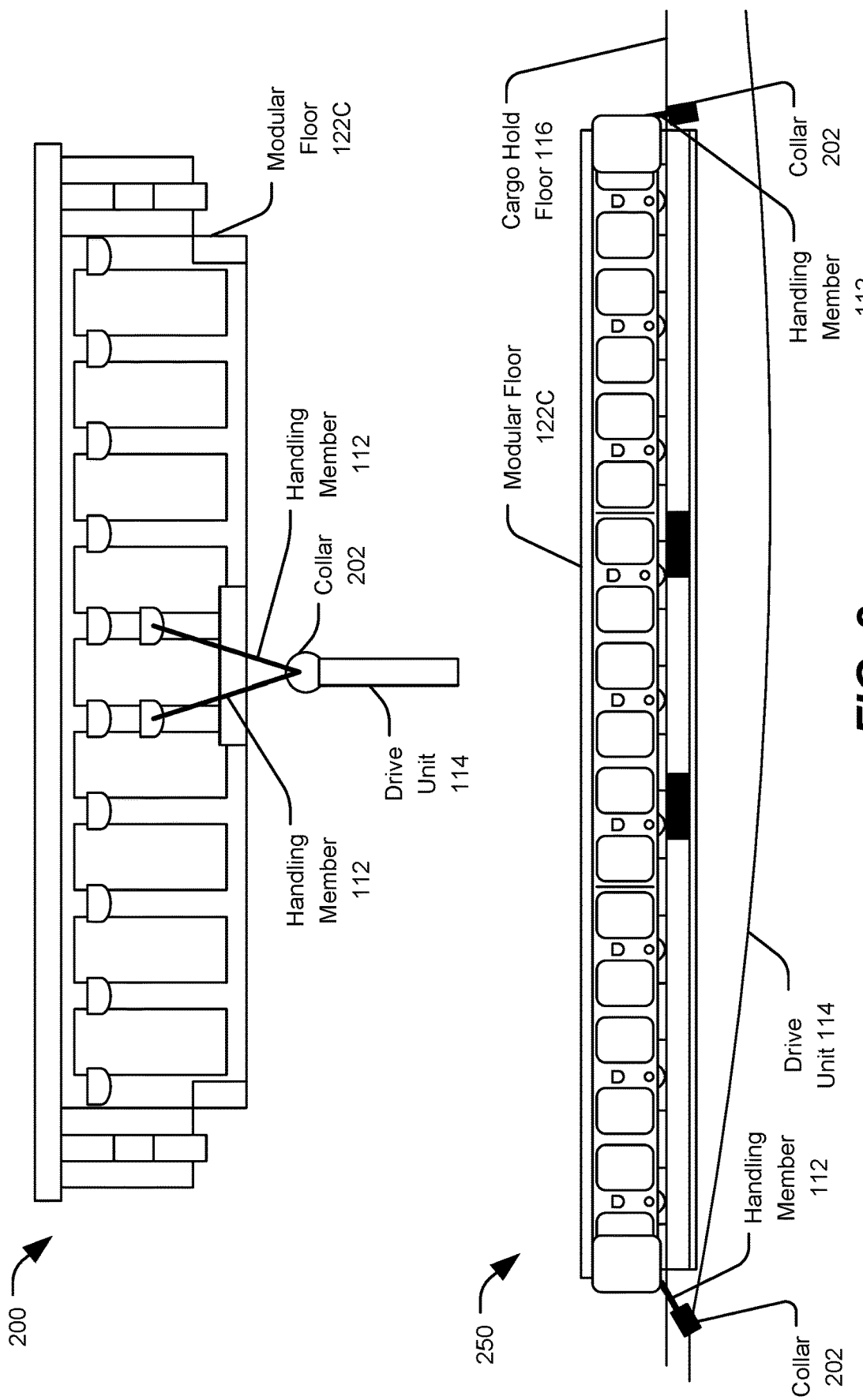
FIG. 2 is a diagram illustrating certain aspects of an example of a modular floor of the cargo loading system of FIG. 1A.

FIG. 2 illustrates particular aspects of a front view 200 and a side view 250 of an example of a modular floor, such as the modular floor 122C.

In the example of FIG. 2, the front view 200 depicts that the handling member 112 is attached to the drive unit 114 via a collar 202. In one example, the collar 202 includes a ring through which the drive unit 114 passes, and the handling member 112 is secured to the collar 202. In a particular example, the collar 202 is collar coupled to the handling member 112 and to the drive unit 114, and the collar 202 is configured to secure the modular floor 122C to the drive unit 114 via the handling member 112.

In the example of the front view 200, two handling members 112 are connected to the drive unit 114 via the collar 202. In other examples, a different number of handling members 112 can be used (e.g., one handling member 112, three handling members 112, or another number of handling members 112).

In FIG. 2, the side view 250 depicts that the modular floor 122C is secured to the drive unit 114 via the handling member 112 and the collar 202. In FIG. 2, counterclockwise rotation of the drive unit 114 causes the handling member 112 to pull the modular floor 122C to the left.

In FIG. 2, each end (left and right) of the modular floor 122C includes a handling member 112 and a collar 202. In a particular example, a left-side handling member 112 and collar 202 are used to pull the modular floor 122C to the left in FIG. 2, and a right-side handling member 112 and collar are used to pull the modular floor 122C to the right in FIG. 2.

In some implementations, a grip or attachment device is attached to the handling member 112 and the drive unit 114. In some examples, the grip or attachment drive is configured to maintain contact between the handling member 112 and the drive unit 114.

One or more aspects described with reference to FIG. 2 can improve efficiency of cargo loading, unloading, or both. For example, in some implementations, use of the drive unit 114 to move the modular floor 122C enables large cargo (e.g., a large shipping container) to be loaded to the modular floor 122C outside the aircraft 100 and moved onto the aircraft 100.

Figure 3:
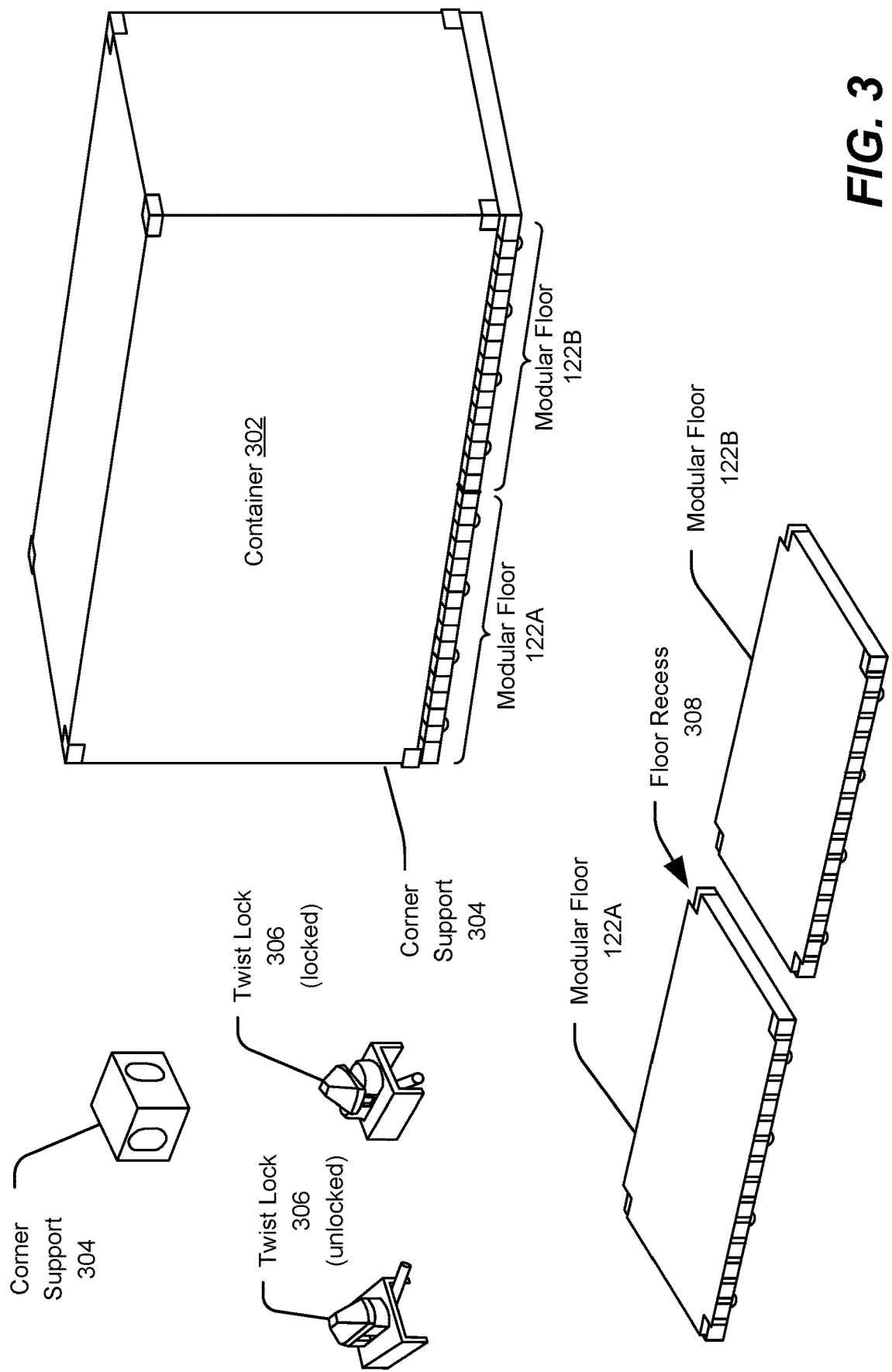
FIG. 3 is another diagram illustrating certain aspects of an example of a modular floor of the cargo loading system of FIG. 1A.

FIG. 3 illustrates additional aspects associated with an example of one or more modular floors, such as the modular floors 122A, 122B.

In FIG. 3, the modular floors 122A, 122B are loaded with a container 302. Examples of the container 302 include a load device (LD), a unit load device (ULD), and an intermodal container, such as an International Organization for Standardization (ISO) container (ISO is a trademark of the International Organization for Standardization of Geneva, Switzerland). Depending on the particular example, the container 302 can have an open configuration (e.g., where the container 302 is a pallet on which cargo is loaded) or a closed configuration (e.g., where cargo is enclosed within the container 302).

In the example of FIG. 3, corners of the modular floor 122C include floor recesses, such as a representative floor recess 308. In a particular example, each floor recess of the modular floor 122C is configured to receive a corresponding corner support of the container 302, such as a representative corner support 304.

Alternatively or in addition to the use of corner supports and floor recesses, in a particular example, the container 302 is attached to the modular floors 122A, 122B using one or more locking mechanisms, such as a representative twist lock 306. To illustrate, in one example, corners of the modular floors 122A, 122B include a twist lock. Upon loading the container 302 to the modular floors 122A, 122B, a lever of each twist lock can be turned to lock the container 302 to the modular floors 122A, 122B.

One or more aspects described with reference to FIG. 3 can improve efficiency of cargo loading, unloading, or both. For example, in some implementations, by connecting the modular floors 122A, 122B, the container 302 (e.g., a large shipping container) can be loaded to the modular floors 122A, 122B outside the aircraft 100 and moved onto the aircraft 100.

Further, in some implementations, a locking mechanism (e.g., the twist lock 306) is used to secure the container 302 to the modular floors 122A, 122B. In some examples, the container 302 is secured to the modular floors 122A, 122B via the twist lock 306 while the modular floors 122A, 122B are positioned outside the aircraft 100, which may be more convenient as compared to other techniques that involve using personnel to enter the interior of a plane to secure cargo.

Figure 4:
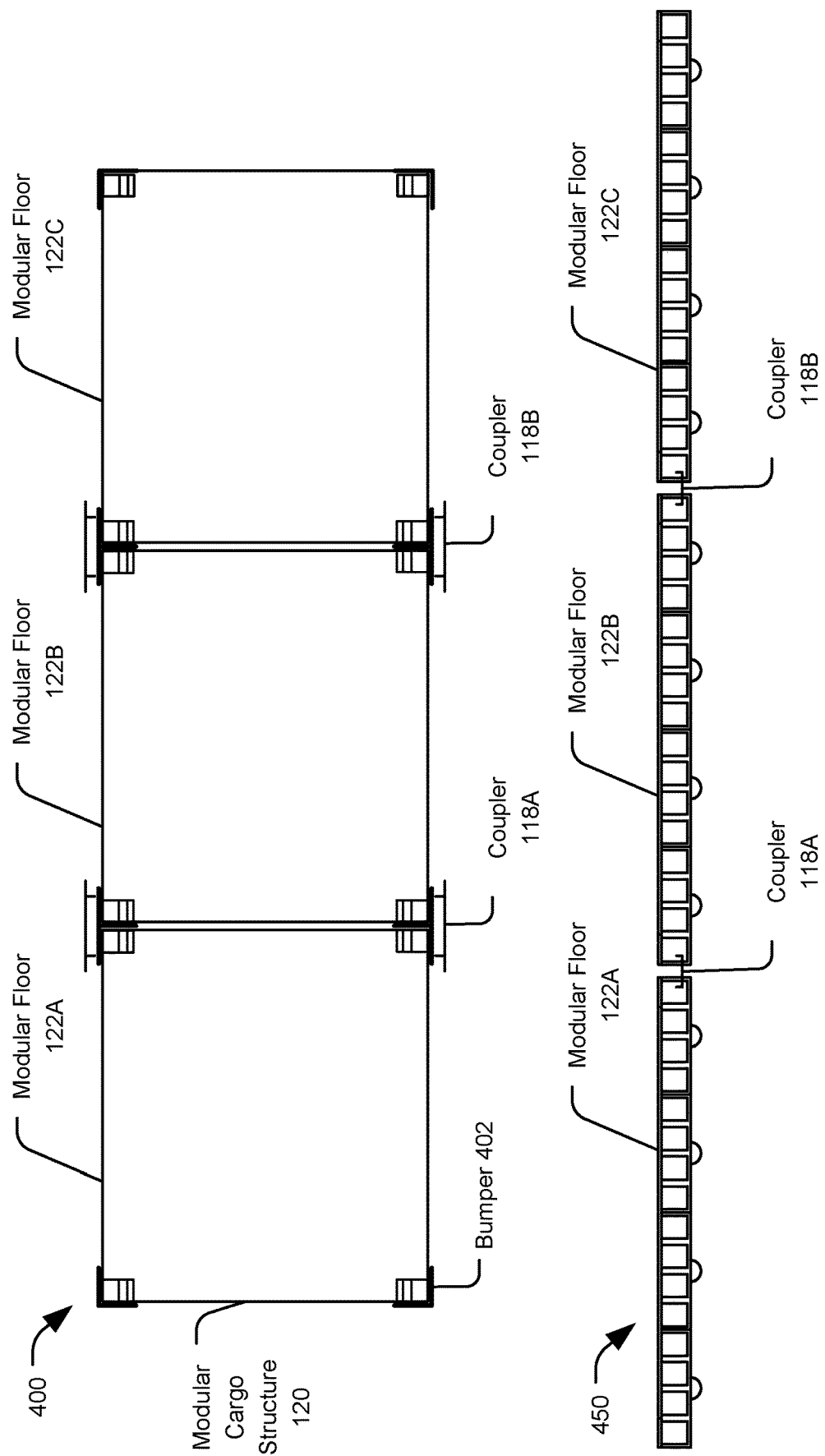
FIG. 4 is another diagram illustrating certain aspects of an example of a modular floor of the cargo loading system of FIG. 1A.

FIG. 4 illustrates particular aspects of a top view 400 and a side view 450 of an example of the modular cargo structure 120. In FIG. 4, the modular cargo structure 120 includes a plurality of modular floors, such as the modular floors 122A, 122B, and 122C.

In the top view 400, each modular floor of the modular cargo structure 120 includes at least one bumper, such as representative bumper 402. FIG. 4 depicts that the bumper 402 corresponds to a corner bumper. In other examples, the bumper 402 can have a different configuration. For example, in some implementations, the bumper 402 can extend across the length of one or more sides of the modular floor 122A, such as where the bumper 402 corresponds to a front bumper that extends across the front of the modular floor 122A.

In FIG. 4, the modular floor 122A is coupled to the modular floor 122B via the coupler 118A. FIG. 4 also depicts that the modular floor 122B is coupled to the modular floor 122C via the coupler 118B.

In some cases, a size of cargo can exceed a size of a particular modular floor of the modular cargo structure 120. In this case, multiple modular floors can be coupled (e.g., via the coupler 118A or the coupler 118B) to enable loading of the cargo. As a particular illustrative example, in some cases, one or more modular floors of the modular cargo structure 120 are each sized to support a particular cargo size, such as a twenty-foot equivalent unit (TEU) size. In this case, one or more modular floors of the modular cargo structure 120 can have a length of approximately twenty feet. In some circumstances, cargo may have a different size, such as a forty-foot equivalent unit (FEU) size. In this example, modular floors of the modular cargo structure 120 can be coupled to support the cargo, such as by coupling the modular floors 122A, 122B via the coupler 118A to support an FEU sized container or by coupling the modular floors 122B, 122C via the coupler 118B to support an FEU sized container, as illustrative examples.

FIG. 4 illustrates that modular floors can be coupled together. As a result, the modular cargo structure 120 can be used to convey cargo of different sizes.

Figure 5:
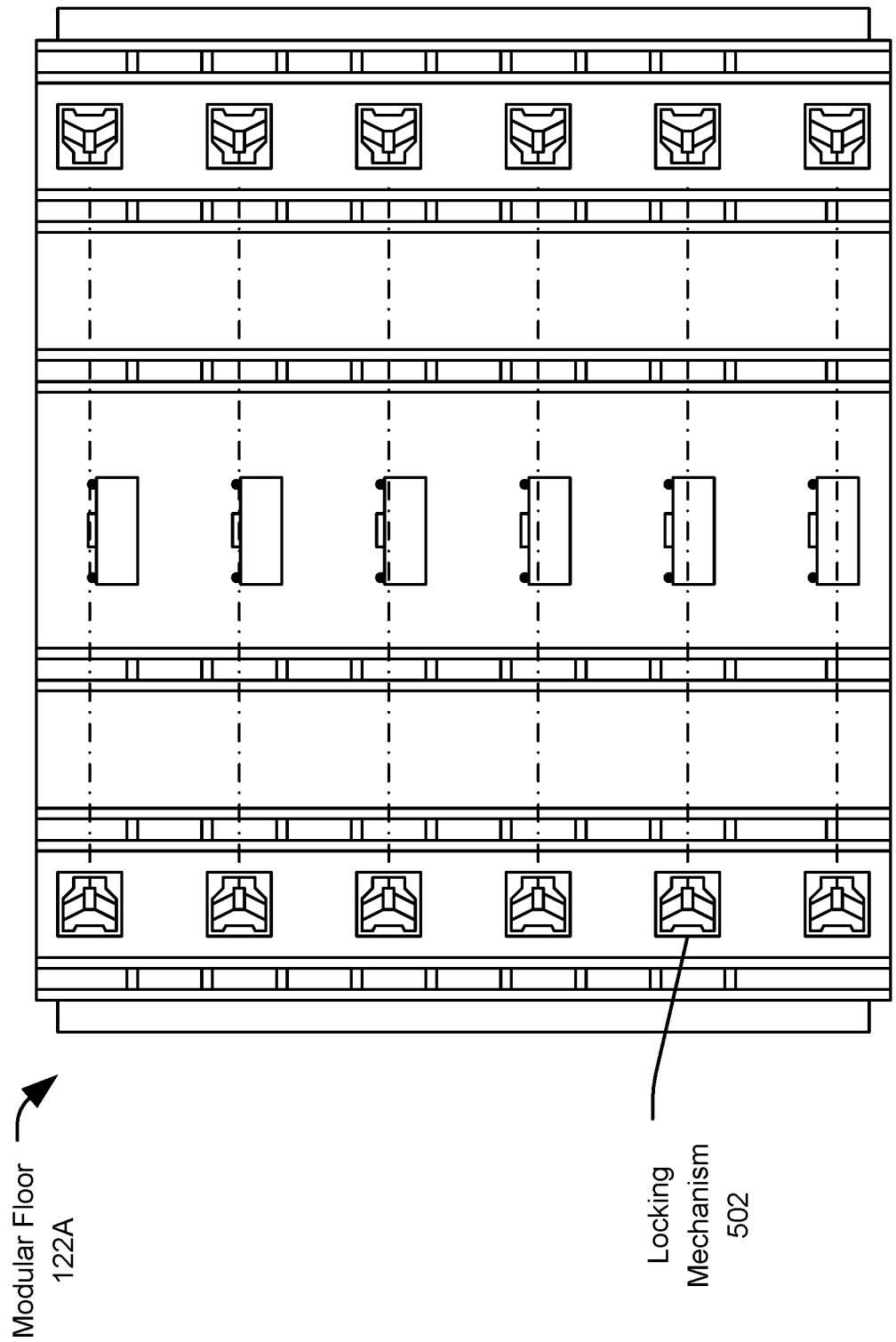
FIG. 5 is another diagram illustrating certain aspects of an example of a modular floor of the cargo loading system of FIG. 1A for accommodating shipping containers and pallets.

FIG. 5 depicts a top view of an example of a modular floor, such as the modular floor 122A. In FIG. 5, the modular floor 122A includes one or more locking mechanisms, such as a representative locking mechanism 502. In some examples, the locking mechanism 502 is configured to secure cargo (e.g., a shipping container) to the modular floor 122A. In some examples, the locking mechanism 502 includes or corresponds to the twist lock 306 of FIG. 3.

FIG. 5 illustrates that a locking mechanism (e.g., the locking mechanism 502) can be used to secure cargo to the modular floor 122A. As a result, in some cases, movement and damage to cargo is reduced or avoided. Further, because the modular floor 122A is removable from the aircraft 100, the cargo can be locked or unlocked outside the aircraft 100, which can be faster or more convenient in some cases (as compared to locking or unlocking cargo within an aircraft).

Figure 6:
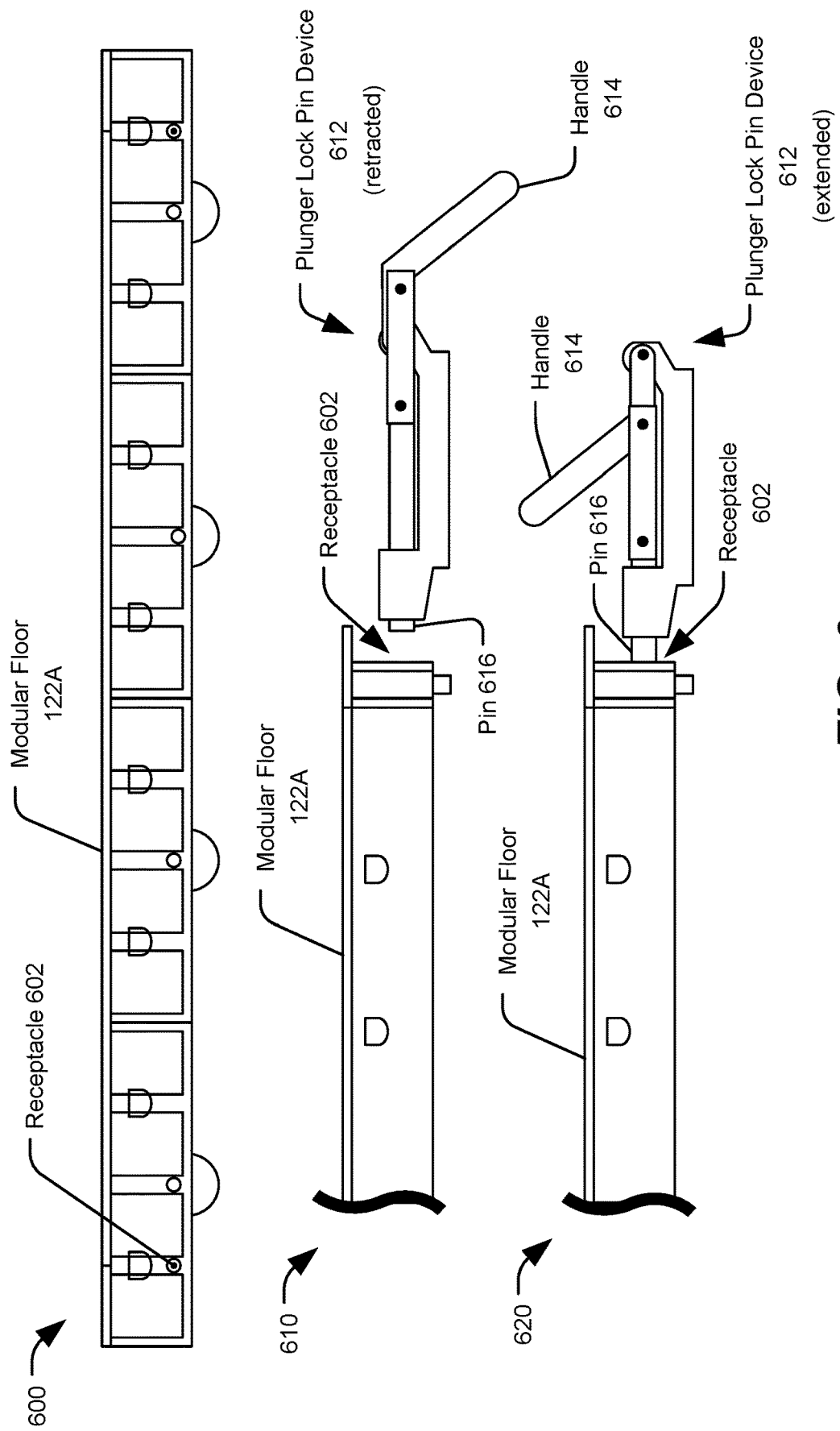
FIG. 6 is another diagram illustrating certain aspects of an example of a modular floor of the cargo loading system of FIG. 1A.

FIG. 6 depicts a side view 600 of an example of a modular floor, such as the modular floor 122A. In FIG. 6, the modular floor 122A is configured to attach to one or more structures of a vehicle, such as one or more structures of the aircraft 100 of FIG. 1. To illustrate, in the example of FIG. 6, the modular floor 122A includes one or more receptacles, such as a representative receptacle 602. In a particular example, the receptacle 602 is configured to receive a structure of the aircraft 100 of FIG. 1.

To illustrate, FIG. 6 depicts a front view 610 of the modular floor 122A and a plunger lock pin device 612 in a retracted position. In a particular example, the plunger lock pin device 612 is included in or fastened to a structure of the aircraft 100 of FIG. 1. For example, in some implementations, the plunger lock pin device 612 is fastened to an airframe of the aircraft 100.

In FIG. 6, the plunger lock pin device 612 includes a handle 614 and a pin 616. In the front view 610, the handle 614 has a first position (e.g., an unlocked position), and the pin 616 has a retracted position. In some examples, the handle 614 is operated automatically (e.g., via a spring latching mechanism). In other examples, the handle 614 is operated manually.

FIG. 6 also illustrates a front view 620 of the modular floor 122A and the plunger lock pin device 612 in an extended position. In a particular example, the handle 614 is configured to retract or extend the pin 616 (e.g., as illustrated at 610 and at 620, respectively). In a particular example, the plunger lock pin device 612 secures the modular floor 122A to the aircraft 100 of FIG. 1 upon extension of the plunger into the receptacle 602 by operation of the handle 614.

In some examples, the receptacle 602 includes one or more bushings. A bushing of the receptacle 602 can be replaced in some cases (e.g., due to physical wear as a result of operation of the plunger lock pin device 612, which can include repeated extension and retraction of the pin 616).

It is noted that certain aspects described herein are illustrative and that other examples are within the scope of the disclosure. For example, although FIG. 6 depicts a single receptacle 602 and a single plunger lock pin device 612, in other examples, multiple receptacles 602 and multiple plunger lock pin devices 612 can be used to secure the modular floor 122A to the aircraft 100. As another example, although FIG. 6 depicts that the modular floor 122A includes a receptacle 602, in other implementations, the modular floor 122A can include a plunger lock pin device 612, and the aircraft 100 of FIG. 1 can include a receptacle 602.

FIG. 6 illustrates that modular floors (e.g., the modular floor 122A) can be locked (e.g., via the plunger lock pin device 612) to a structure of the aircraft 100. As a result, the modular floor 122A can be loaded with cargo outside the aircraft 100, moved inside the aircraft 100, and subsequently secured (e.g., automatically secured) to the interior of the aircraft 100, which can be faster or more convenient in some cases as compared to techniques that involve personnel entering an aircraft to manually secure cargo inside the aircraft.

Figure 7:
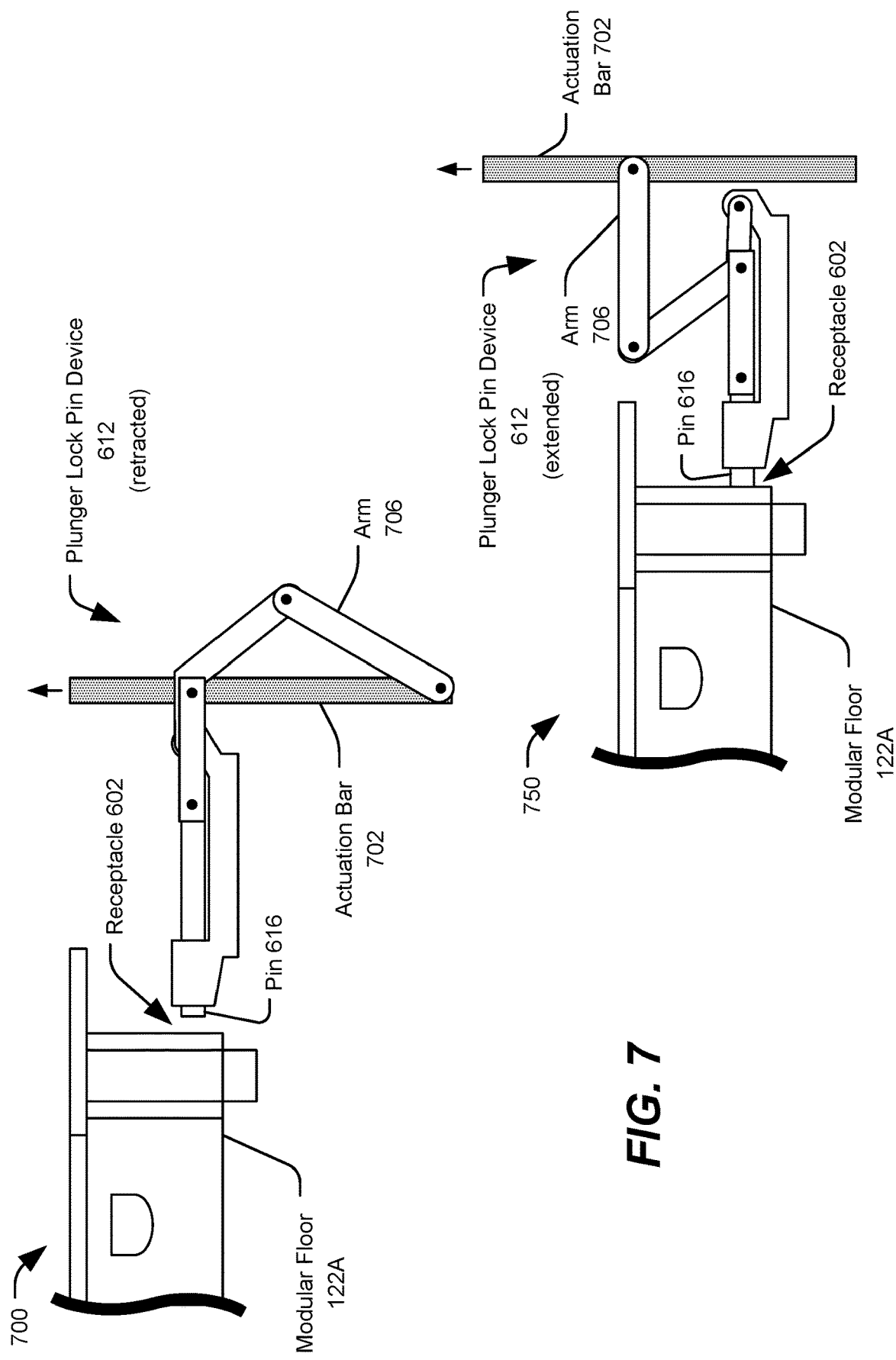
FIG. 7 is another diagram illustrating certain aspects of an example of a modular floor of the cargo loading system of FIG. 1A.

FIG. 7 illustrates aspects of an example of a plunger lock pin device, such as the plunger lock pin device 612. In the example of FIG. 7, the plunger lock pin device 612 includes (or is coupled to) an actuation bar 702 and an arm 706. In some examples, the actuation bar 702 is included in or fastened to a structure of a vehicle, such as a structure of the aircraft 100 of FIG. 1. For example, in some implementations, the actuation bar 702 is movably fastened to an airframe of the aircraft 100 (so that the actuation bar 702 can move relative to the airframe within a particular range of motion).

At 700, the plunger lock pin device 612 is disengaged from the modular floor 122A. For example, at 700, the pin 616 is disengaged from the receptacle 602 of the modular floor 122A.

At 750, the actuation bar 702 is moved (upward in the example of FIG. 7) to extend the pin 616 into the receptacle 602 via the arm 706. In a particular example, extending the pin 616 into the receptacle 602 secures the modular floor 122A to the aircraft 100 of FIG. 1 via the plunger lock pin device 612. In some examples, the aircraft 100 includes a locking mechanism configured to lock the actuation bar 702 in a particular position (e.g., to prevent disengagement of the pin 616 from the receptacle 602 due to movement of the actuation bar 702).

FIG. 7 illustrates that modular floors (e.g., the modular floor 122A) can be locked (e.g., via the plunger lock pin device 612) to a structure of the aircraft 100. As a result, the modular floor 122A can be loaded with cargo outside the aircraft 100, moved inside the aircraft 100, and subsequently secured (e.g., automatically secured) to the interior of the aircraft 100, which can be faster or more convenient in some cases as compared to techniques that involve personnel entering an aircraft to manually secure cargo inside the aircraft.

Figure 8A:
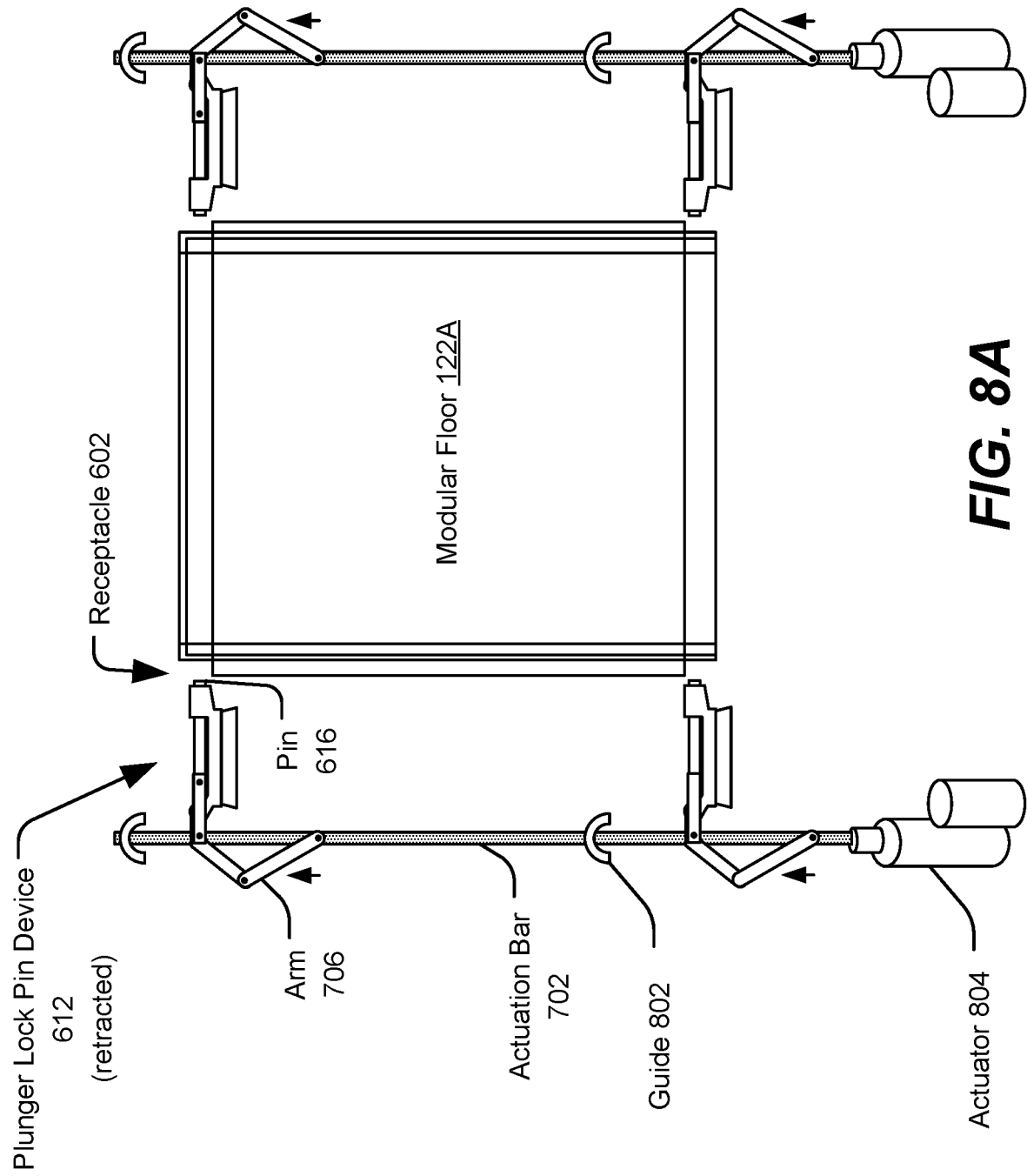
FIG. 8A is another diagram illustrating certain aspects of an example of a modular floor of the cargo loading system of FIG. 1A.

FIG. 8A depicts a top view of additional aspects of a vehicle (e.g., the aircraft 100 of FIG. 1) and a modular floor, such as the modular floor 122A. In FIG. 8A, the modular floor 122A is configured to secure to multiple plunger lock pin devices, such as the plunger lock pin device 612. The plunger lock pin devices of FIG. 8A are coupled to actuation bars, such as the actuation bar 702. In a particular example, each actuation bar illustrated in FIG. 8A is attached to a structure of the aircraft 100 of FIG. 1, such as to an airframe of the aircraft 100.

In some implementations, a guide is used to align an actuation bar. To illustrate, FIG. 8A depicts that a guide 802 is used to align the actuation bar 702.

In some implementations, each actuation bar of FIG. 8A is coupled to a respective actuator. For example, in FIG. 8A, the actuation bar 702 is coupled to an actuator 804 (e.g., a linear kinematic actuator) that is configured to move the actuation bar 702 to cause the plunger lock pin device 612 to extend the pin 616 into the receptacle 602. Upon moving the actuation bar 702, the plunger lock pin device 612 extends the pin 616 into the receptacle 602, as illustrated in the example of FIG. 8B.

Figure 8B:
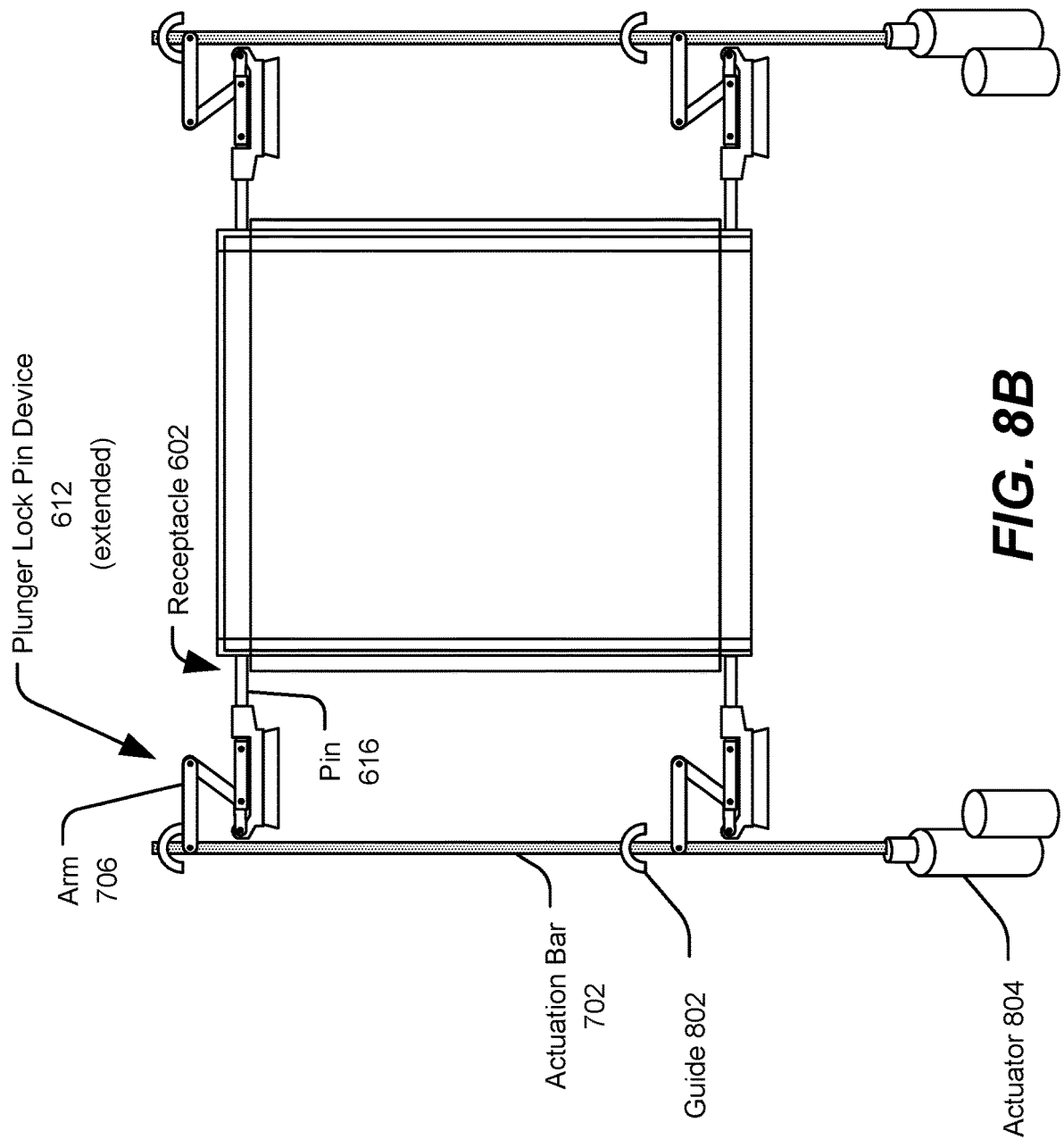
FIG. 8B is another diagram illustrating certain aspects of an example of a modular floor of the cargo loading system of FIG. 1A.

FIGS. 8A and 8B illustrate that modular floors (e.g., the modular floor 122A) can be locked (e.g., via the plunger lock pin device 612) to a structure of the aircraft 100 using one or more actuators, such as the actuator 804. As a result, the modular floor 122A can be loaded with cargo outside the aircraft 100, moved inside the aircraft 100, and subsequently secured (e.g., automatically secured using the actuator 804) to the interior of the aircraft 100, which can be faster or more convenient in some cases as compared to techniques that involve personnel entering an aircraft to manually secure cargo inside the aircraft.

Figure 9A:
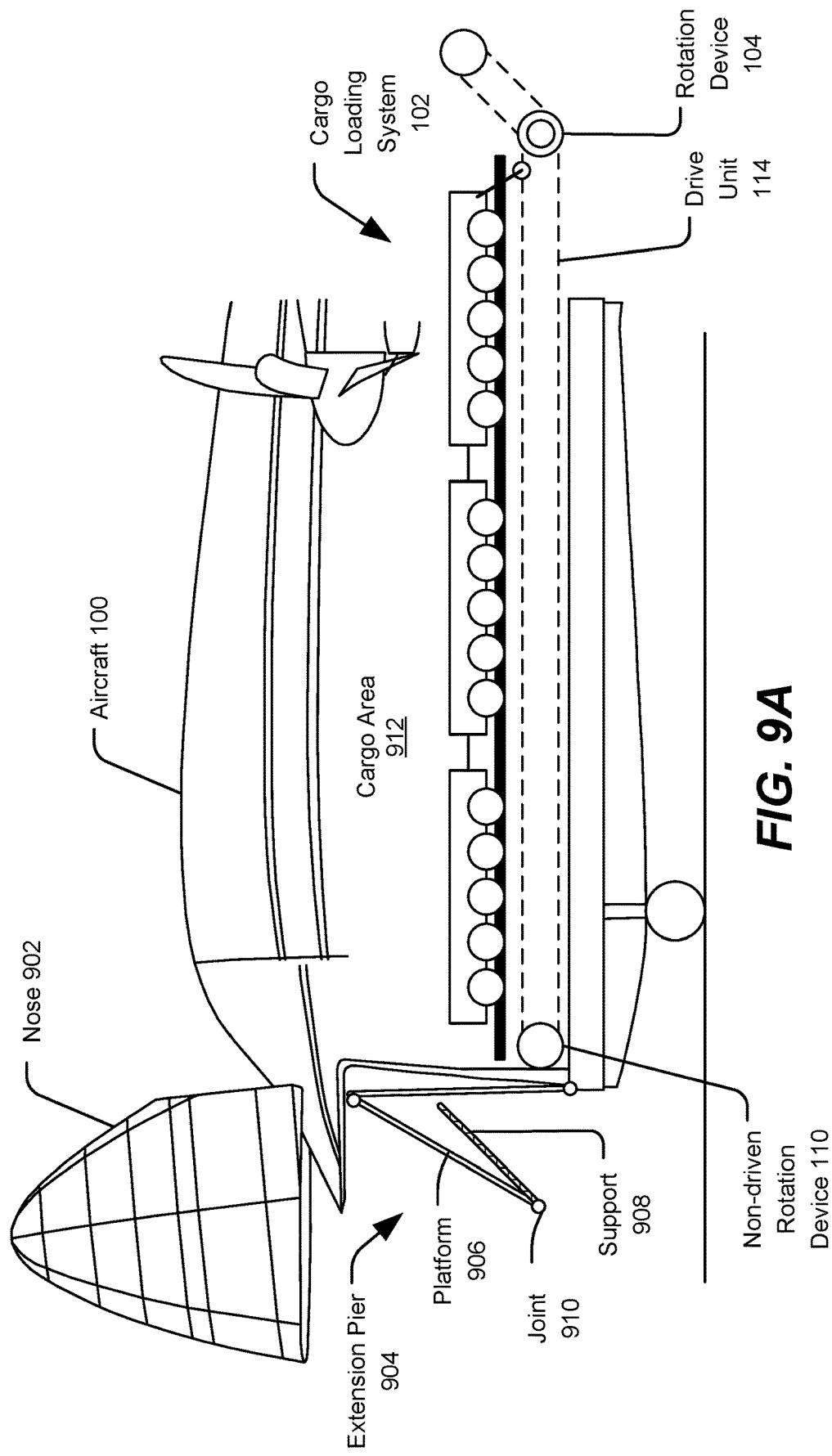
FIG. 9A is a diagram illustrating certain aspects of an example of the cargo loading system of FIG. 1A.

FIG. 9A depicts aspects associated with a particular example of the aircraft 100. In FIG. 9A, a nose 902 of the aircraft 100 is displaceable (e.g., via a hinge or another mechanism) to expose a cargo area 912 of the aircraft 100. In some examples, the nose 902 corresponds to the hatch 108 described with reference to FIG. 1. In some examples, the drive unit 114 extends along a length the cargo area 912 of the aircraft 100 (e.g., from the nose 902, or near the nose 902, to a tail of the aircraft 100, or near the tail of the aircraft 100). In a particular example, the rotation device 104 is in contact with the drive unit 114 at a first end of the cargo area 912 (e.g., near a tail of the aircraft 100, as an illustrative example), and the non-driven rotation device 110 is in contact with the drive unit 114 at a second end of the cargo area 912 (e.g., near the nose 902 of the aircraft 100, as an illustrative example).

In FIG. 9A, the aircraft 100 includes an extension pier 904. In the example of FIG. 9A, the extension pier 904 is partially extended out of the aircraft 100. For example, in some implementations, the extension pier 904 is fully retracted within the aircraft 100 and the nose 902 is closed during taxiing or flight of the aircraft 100.

In some implementations, the extension pier 904 includes at least one joint (e.g., a joint 910) to enable retraction of the extension pier 904 within the aircraft 100. For example, the joint 910 enables retraction of a platform 906 and a support 908 within the aircraft 100.

Figure 9B:
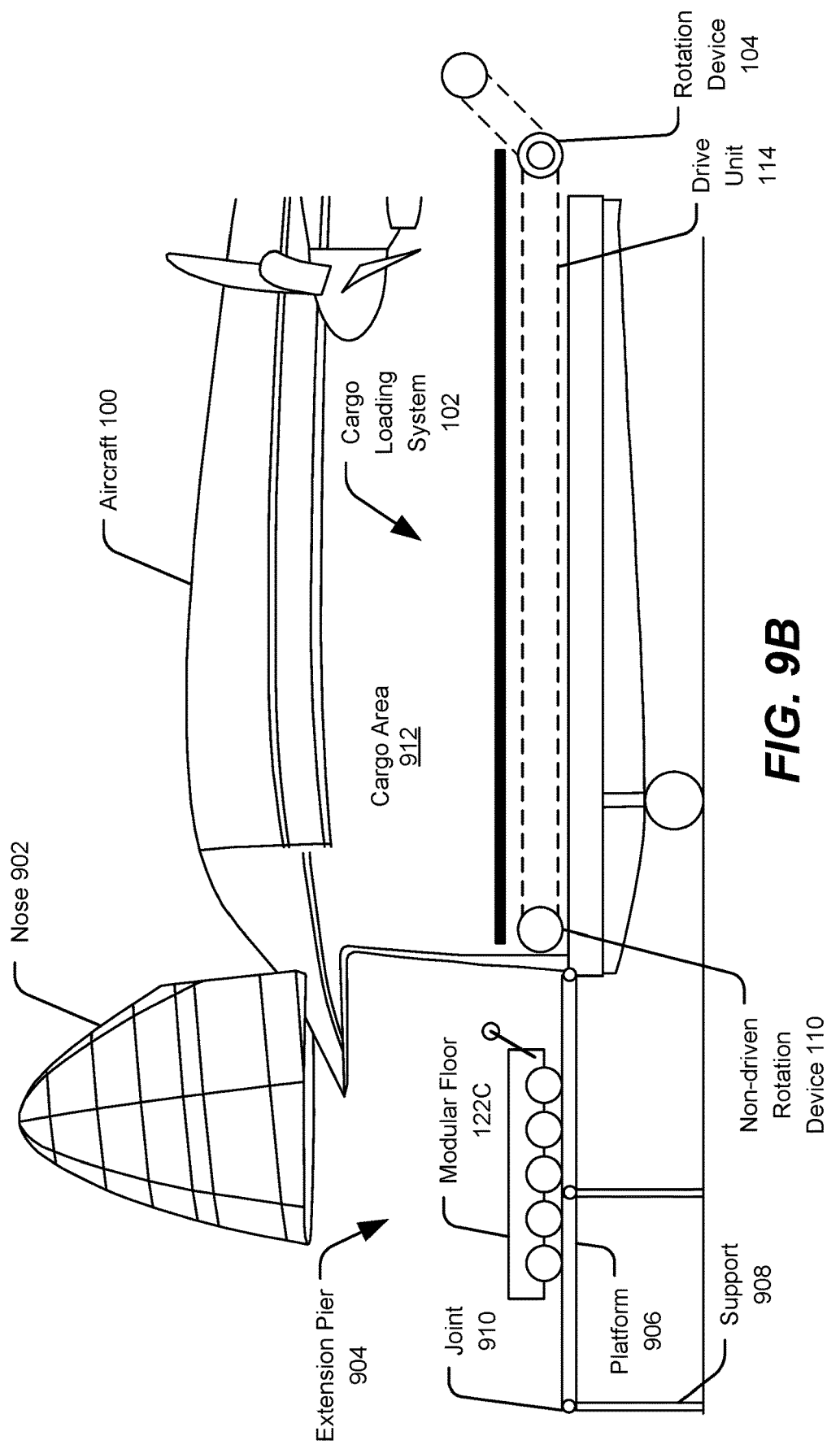
FIG. 9B is another diagram illustrating certain aspects of an example of the cargo loading system of FIG. 1A.

FIG. 9B depicts the extension pier 904 in an extended position. As illustrated in FIG. 9B, the modular floor 122C is loaded onto the extension pier 904.

In some examples, the extension pier 904 is included in or coupled to the cargo loading system 102 of FIG. 1. To illustrate, in a particular example, the extension pier 904 corresponds to the cargo platform 106 described with reference to FIG. 1. In another example, the extension pier 904 is included in the cargo loading system 102. For example, in some implementations, the drive unit 114 of FIG. 1 extends along a length of the extension pier 904. In this example, the modular floor 122C can be moved along the extension pier 904 using the cargo platform 106, such as by moving the drive unit 114 using the driver 130 to load the modular floor 122C into or out of the cargo area 912. In a particular example, the extension pier 904 includes the drive unit 114 (or at least a portion of the drive unit 114).

One or more aspects of FIGS. 9A and 9B enable convenient loading of cargo, unloading or cargo, or both. For example, in some cases, use of the extension pier 904 facilitates cargo loading or unloading via the cargo loading system 102. Further, in some implementations, the extension pier 904 includes one or more joints (e.g., the joint 910) to facilitate retraction and extension of the extension pier 904.

Figure 10:
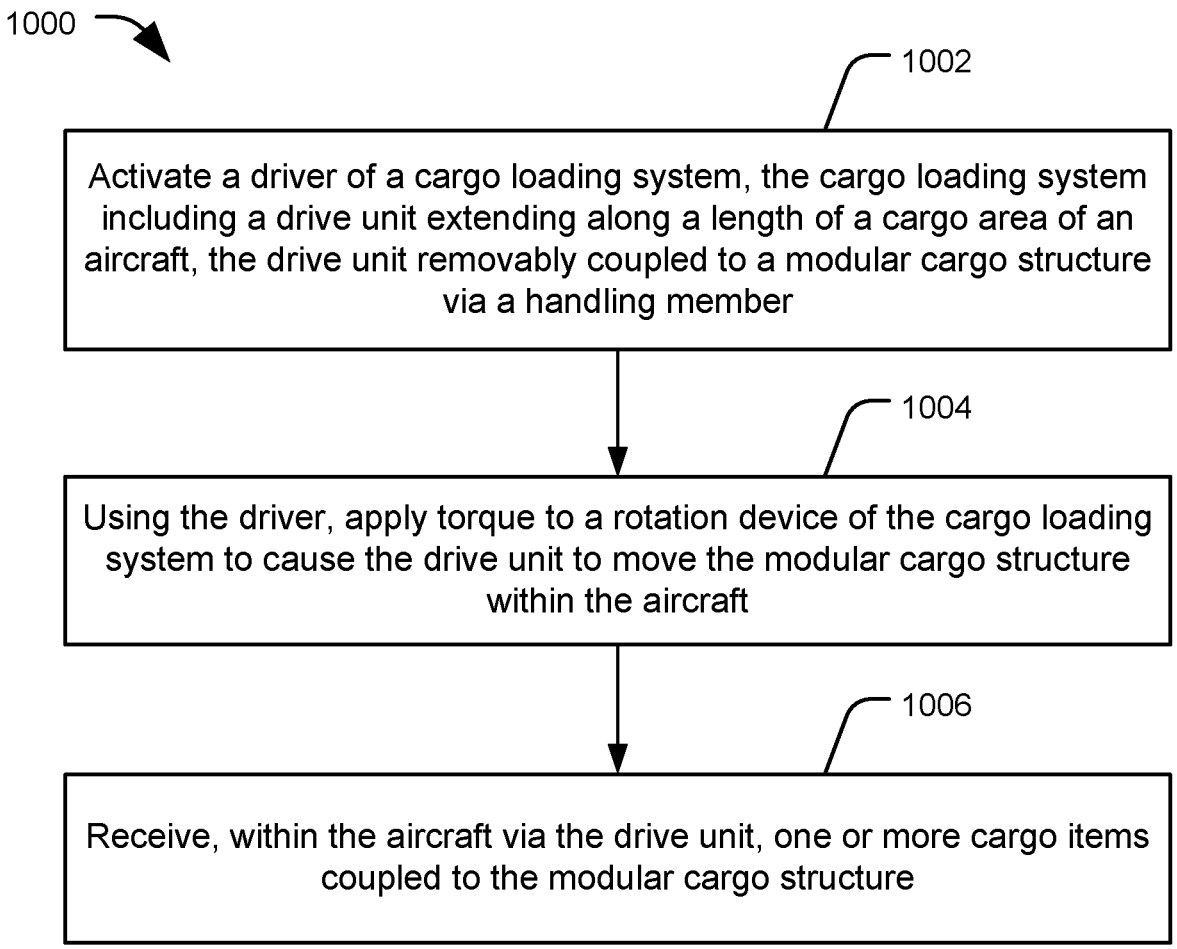
FIG. 10 is a flow chart of an example of a method of cargo loading of an aircraft.

Referring to FIG. 10, a particular illustrative example of a method of cargo loading of an aircraft is depicted and generally designated 1000. In a particular example, the method 1000 is performed to load cargo into the aircraft 100.

The method 1000 includes activating a driver (e.g., the driver 130) of a cargo loading system (e.g., the cargo loading system 102), at 1002. The cargo loading system includes a drive unit (e.g., the drive unit 114) extending along a length of a cargo area (e.g., the cargo area 912) of an aircraft (e.g., the aircraft 100). The drive unit is removably coupled to a modular cargo structure (e.g., the modular cargo structure 120) via a handling member (e.g., the handling member 112).

The method 1000 further includes applying torque, using the driver, to a rotation device (e.g., the rotation device 104) of the cargo loading system to cause the drive unit to move the modular cargo structure within the aircraft, at 1004. The method 1000 further includes receiving, within the aircraft via the drive unit, one or more cargo items (e.g., the cargo 140) coupled to the modular cargo structure, at 1006.

In some implementations, the method 1000 further includes securing the modular cargo structure to the aircraft via a plunger lock pin device. For example, in some implementations, the modular cargo structure 120 can be secured to an interior component of an airframe of the aircraft 100 via the plunger lock pin device 612. In some implementations, the modular cargo structure 120 is automatically secured to a structure of the aircraft 100, which can be faster or more convenient as compared to manually securing cargo inside a plane by personnel.

In some examples, the method 1000 of FIG. 10 simplifies cargo loading into an aircraft. For example, by unloading a modular cargo structure of the aircraft using a cargo loading system and by loading cargo to the modular cargo structure outside the aircraft, cargo loading can be performed more efficiently or faster as compared to other techniques.

Figure 11:
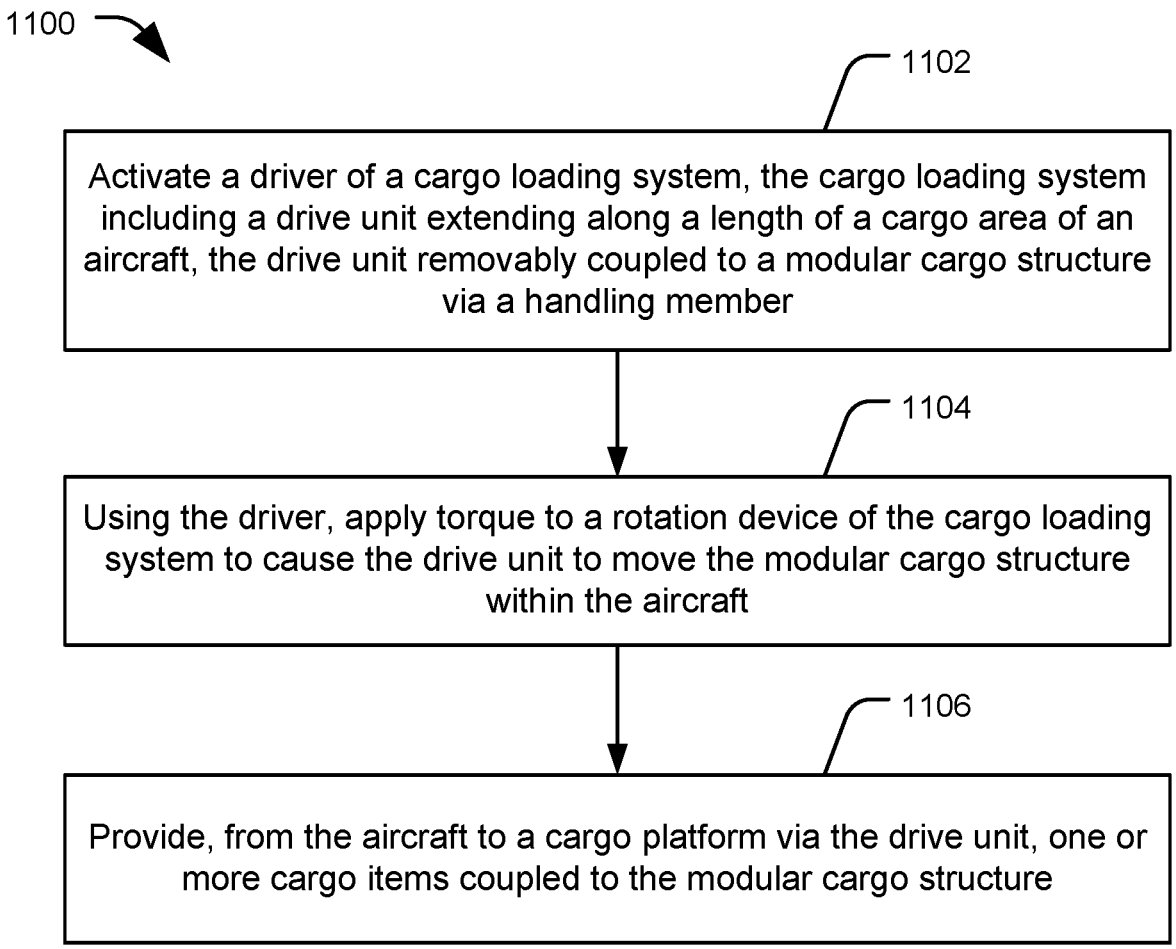
FIG. 11 is a flow chart of an example of a method of cargo unloading from an aircraft.

Referring to FIG. 11, a particular illustrative example of a method of unloading cargo from an aircraft is depicted and generally designated 1100. In a particular example, the method 1100 is performed to unload cargo from the aircraft 100.

The method 1100 includes activating a driver (e.g., the driver 130) of a cargo loading system (e.g., the cargo loading system 102), at 1102. The cargo loading system includes a drive unit (e.g., the drive unit 114) extending along a length of a cargo area (e.g., the cargo area 912) of an aircraft (e.g., the aircraft 100). The drive unit is removably coupled to a modular cargo structure (e.g., the modular cargo structure 120) via a handling member (e.g., the handling member 112).

The method 1100 further includes applying torque, using the driver, to a rotation device (e.g., the rotation device 104) of the cargo loading system to cause the drive unit to move the modular cargo structure within the aircraft, at 1104. The method 1100 further includes providing, from the aircraft to a cargo platform (e.g., the cargo platform 106) via the drive unit, one or more cargo items (e.g., the cargo 140) coupled to the modular cargo structure, at 1106.

In some implementations, the method 1100 further includes detaching the modular cargo structure from the aircraft via a plunger lock pin device. For example, in some implementations, the modular cargo structure 120 can be unlocked from an interior component of an airframe of the aircraft 100 via the plunger lock pin device 612. In some implementations, the modular cargo structure 120 is automatically unlocked from a structure of the aircraft 100 (e.g., by activation of the actuator 804 upon landing the aircraft 100), which can be faster or more convenient as compared to manually unlocking cargo inside a plane by personnel.

In some examples, the method 1100 of FIG. 11 simplifies cargo unloading from an aircraft. For example, by unloading a modular cargo structure of the aircraft using a cargo loading system and by unloading cargo from the modular cargo structure outside the aircraft, cargo unloading can be performed more efficiently or faster as compared to other techniques.

Figure 12:
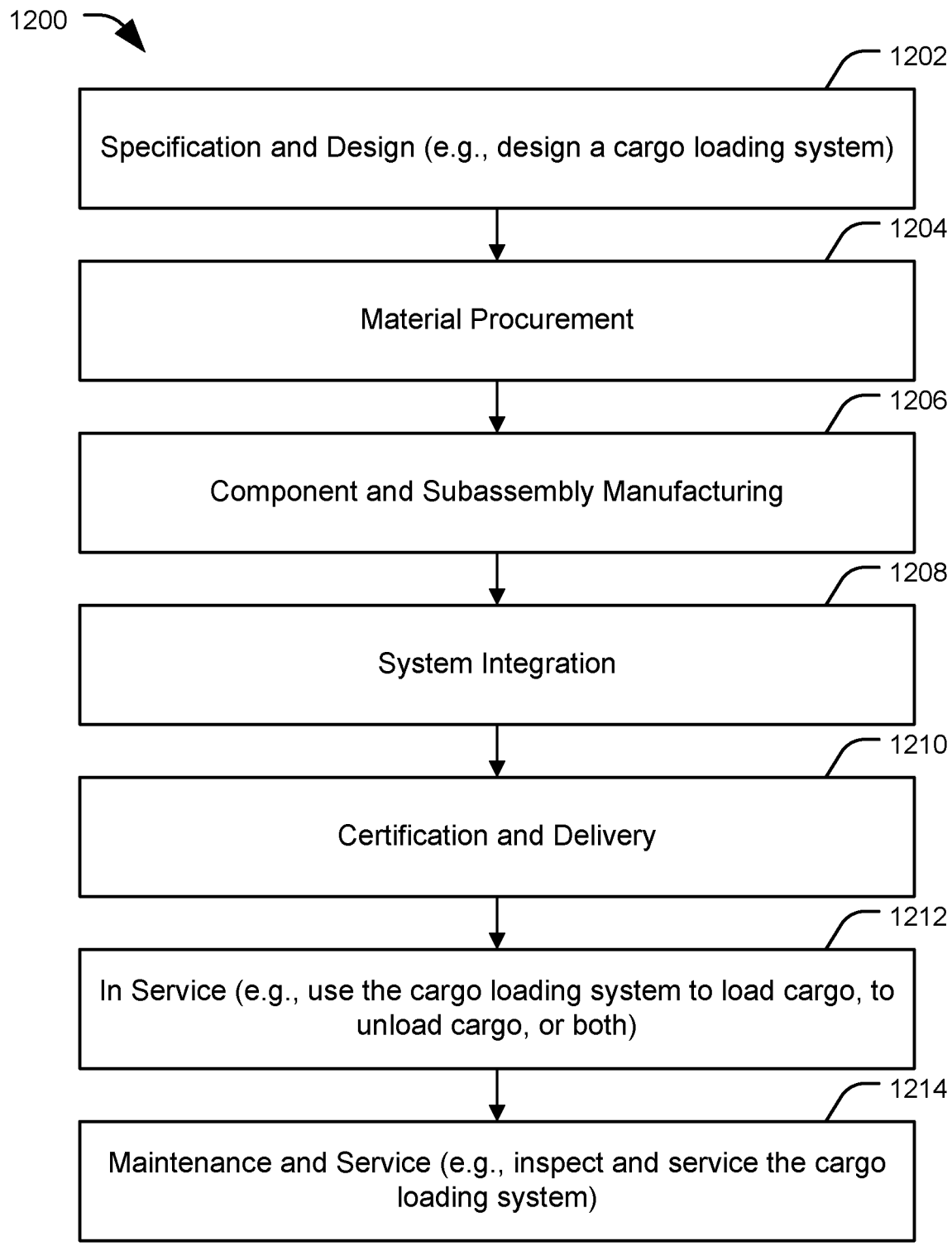
FIG. 12 is a flow chart of an example of a life cycle of a vehicle including the cargo loading system of FIG. 1A.

Referring to FIG. 12, a flowchart of an illustrative example of a life cycle of a vehicle (e.g., an aircraft, such as the aircraft 100) including the cargo loading system 102 is depicted and generally designated 1200. During pre-production, the method 1200 includes specification and design of the vehicle, at 1202. During the specification and design of the vehicle, the method 1200 includes specifying components, such as one or more components of the cargo loading system 102.

At 1204, the method 1200 includes material procurement. For example, the method 1200 can include procuring materials for the vehicle (such as by procuring materials for the cargo loading system 102).

During production, the method 1200 includes component and subassembly manufacturing, at 1206, and system integration of the vehicle, at 1208. In some examples, one or more components of the cargo loading system 102 are manufactured or assembled (at 1206) and integrated within the vehicle (at 1208).

The method 1200 includes certification and delivery of the vehicle, at 1210, and placing the vehicle in service, at 1212. In some implementations, certifying the vehicle includes performing a test process of the cargo loading system 102. In some implementations, while in service, the vehicle uses the cargo loading system 102 to load cargo to the vehicle, to unload cargo from the vehicle, or both.

While in service, the vehicle may be scheduled for routine maintenance and service (which may also include modification, reconfiguration, refurbishment, and so on). At 1214, the method 1200 includes performing maintenance and service on the vehicle. To illustrate, in some examples, performing maintenance and service may include inspecting and servicing the physical connection of the cargo loading system 102. In some implementations, performing maintenance and service includes inspecting components of the cargo loading system 102 that may be subject to physical wear, such as by inspecting a bushing that can be included in the receptacle 602, as an illustrative example.

Figure 13:
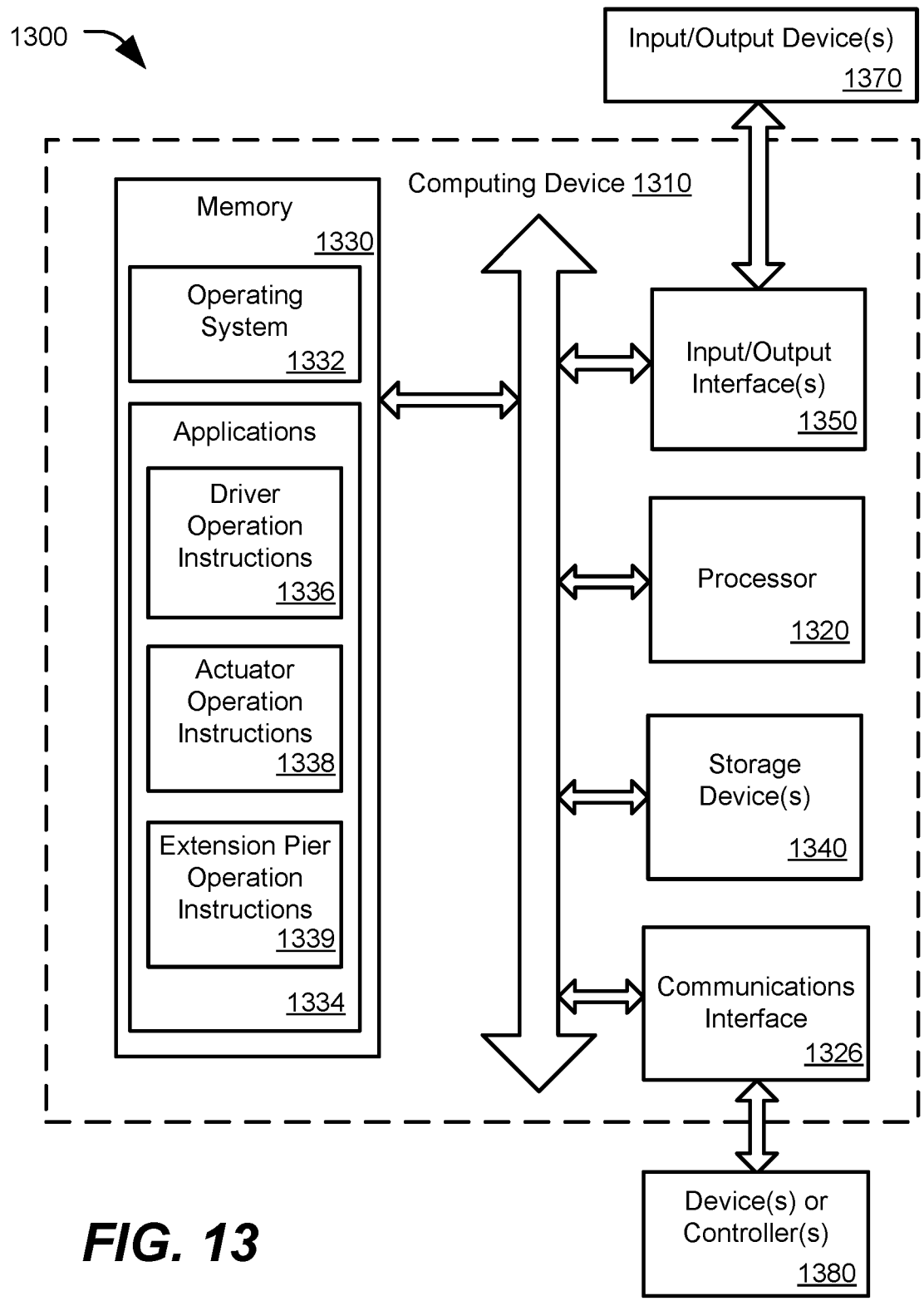
FIG. 13 is a block diagram illustrating aspects of an example of a computing system that is configured to execute instructions to initiate, perform, or control operations, such as operations of the method of FIG. 10, the method of FIG. 11, or both.

FIG. 13 is an illustration of a block diagram of a computing environment 1300 including a computing device 1310. The computing device 1310 is configured to support embodiments of computer-implemented methods and computer-executable program instructions (or code) according to the present disclosure. In some examples, the computing device 1310, or portions thereof, executes instructions to initiate, perform, or control operations described herein. In some implementations, the computing device 1310 is integrated within a vehicle, such as the aircraft 100 of FIG. 1.

The computing device 1310 includes a processor 1320. The processor 1320 is configured to communicate with a memory 1330 (e.g., a system memory or another memory), one or more storage devices 1340, one or more input/output interfaces 1350, a communications interface 1326, or a combination thereof.

Depending on the particular implementation, the memory 1330 includes volatile memory devices (e.g., volatile random access memory (RAM) devices), nonvolatile memory devices (e.g., read-only memory (ROM) devices, programmable read-only memory, or flash memory), one or more other memory devices, or a combination thereof. In FIG. 13, the memory 1330 stores an operating system 1332, which can include a basic input/output system for booting the computing device 1310 as well as a full operating system to enable the computing device 1310 to interact with users, other programs, and other devices. The particular example of FIG. 13 also depicts that the memory 1330 stores one or more applications 1334 executable by the processor 1320. In some examples, the one or more applications 1334 include instructions executable by the processor 1320 to transmit signals between components of the computing device 1310, such as the memory 1330, the one or more storage devices 1340, the one or more input/output interfaces 1350, the communications interface 1326, or a combination thereof.

In the example of FIG. 13, the one or more applications 1334 include driver operation instructions 1336. In a particular example, the processor 1320 is configured to execute the driver operation instructions 1336 to control operation of the driver 130 of FIG. 1, such as by executing the driver operation instructions 1336 to activate the driver 130, to cause the driver 130 to move the rotation device 104 in one direction (e.g., a clockwise direction), to cause the driver 130 to move the rotation device 104 in another direction (e.g., a counterclockwise direction), to deactivate the driver 130, to perform one or more other operations, or a combination thereof.

Alternatively or in addition, in some examples, the one or more applications 1334 include actuator operation instructions 1338. In a particular example, the processor 1320 is configured to execute the actuator operation instructions 1338 to control the actuator 804, such as to cause the actuator 804 to move the actuation bar 702 to retract the plunger lock pin device 612, to cause the actuator 804 to move the actuation bar 702 to extend the plunger lock pin device 612, to perform one or more other operations, or a combination thereof.

Alternatively or in addition, in some examples, the one or more applications 1334 include extension pier operation instructions 1339. In a particular example, the processor 1320 is configured to execute the extension pier operation instructions 1339 to control the extension pier 904, such as to cause a motor, an actuator, or another device to extend the extension pier 904, to retract the extension pier 904, to perform one or more other operations, or a combination thereof.

In some implementations, one or more storage devices 1340 include nonvolatile storage devices, such as magnetic disks, optical disks, or flash memory devices. In some examples, the one or more storage devices 1340 include removable memory devices, non-removable memory devices or both. In some cases, the one or more storage devices 1340 are configured to store an operating system, images of operating systems, applications, and program data. In a particular example, the memory 1330, the one or more storage devices 1340, or both, include tangible computer-readable media.

In the example of FIG. 13, the processor 1320 is configured to communicate with the one or more input/output interfaces 1350 to enable the computing device 1310 to communicate with one or more input/output devices 1370 to facilitate user interaction. In some implementations, the one or more input/output interfaces 1350 include serial interfaces (e.g., universal serial bus (USB) interfaces or Institute of Electrical and Electronics Engineers (IEEE) 1394 interfaces), parallel interfaces, display adapters, audio adapters, one or more other interfaces, or a combination thereof. In some examples, the one or more input/output devices 1370 include keyboards, pointing devices, displays, speakers, microphones, touch screens, one or more other devices, or a combination thereof. In some examples, the processor 1320 is configured to detect interaction events based on user input received via the one or more input/output interfaces 1350. Alternatively or in addition, in some implementations, the processor 1320 is configured to send information to a display via the one or more input/output interfaces 1350.

In a particular example, the processor 1320 is configured to communicate with (or send signals to) one or more devices 1380 using the communications interface 1326. In some implementations, the communications interface 1326 includes one or more wired interfaces (e.g., Ethernet interfaces), one or more wireless interfaces that comply with an IEEE 802.11 communication protocol, one or more other wireless interfaces, one or more optical interfaces, or one or more other network interfaces, or a combination thereof. In some examples, the one or more devices 1380 include host computers, servers, workstations, one or more other computing devices, or a combination thereof.

Figure 14:
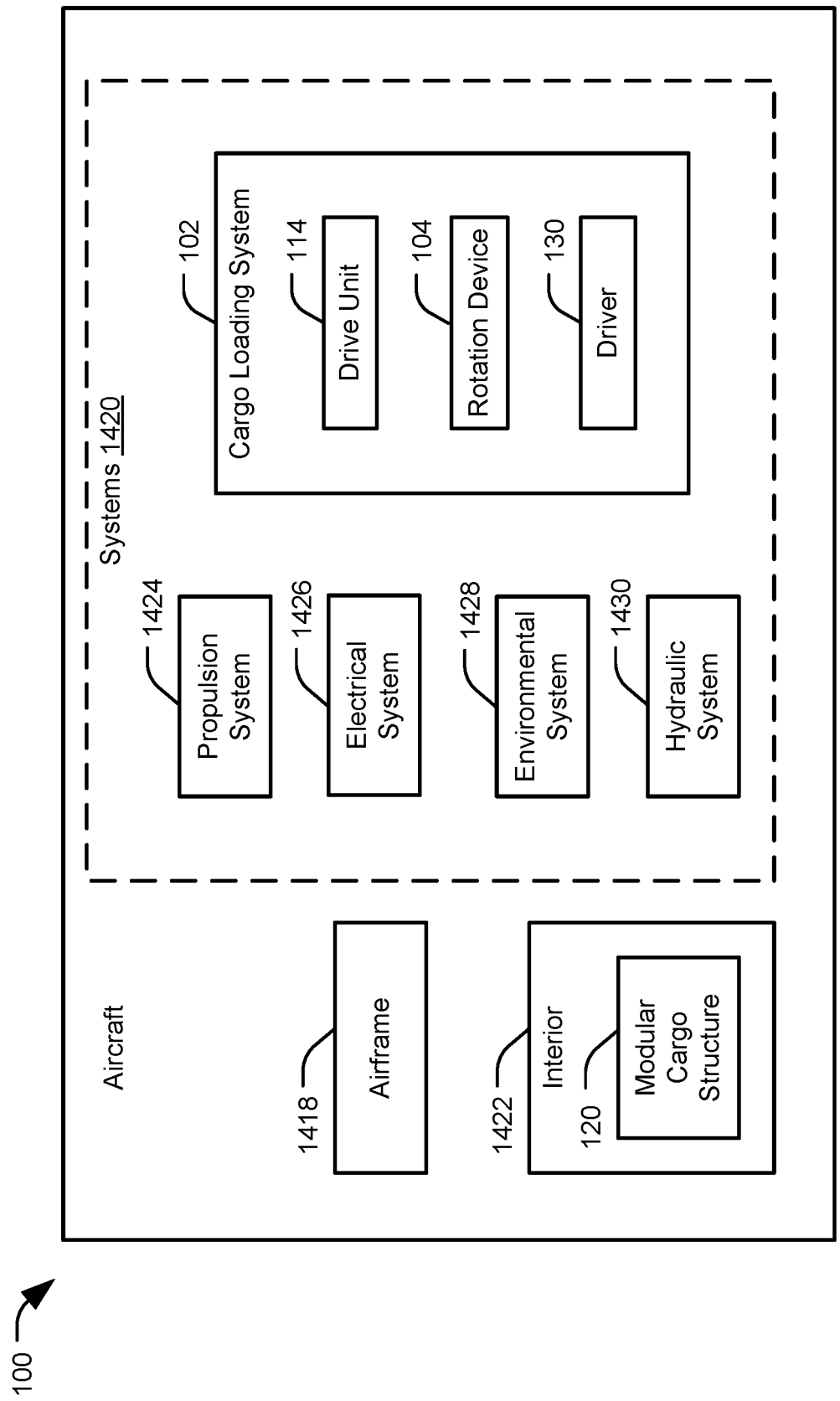
FIG. 14 is a block diagram illustrating aspects of an illustrative implementation of a vehicle that includes the cargo loading system of FIG. 1A.

Aspects of the disclosure may be described in the context of an example of a vehicle, such as the aircraft 100 as shown in the example of FIG. 14. As shown in FIG. 14, the aircraft 100 includes an airframe 1418 with a plurality of systems 1420 and an interior 1422. Examples of the plurality of systems 1420 include one or more of a propulsion system 1424, an electrical system 1426, an environmental system 1428, a hydraulic system 1430, and the cargo loading system 102. Any number of other systems may be included.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate, but do not limit, the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A cargo loading system comprising:
   a drive unit extending along a length of a cargo area of an aircraft, the length of the cargo area having a first end and a second end, the first end being near a nose of the aircraft and the second end being near a tail of the aircraft, the drive unit configured to couple to a first floor of a plurality of floors in a modular cargo structure via a handling member and to convey one or more cargo items coupled to the modular cargo structure;
   a rotation device in contact with the drive unit;
   a driver configured to apply torque to the rotation device to cause the drive unit to move the modular cargo structure within the aircraft; and
   a plunger lock pin device configured to secure the first floor of the modular cargo structure to an interior of the aircraft, the plunger lock pin device having a first end and a second end opposite the first end, the first end comprising a pin and the second end comprising a handle, the pin configured to extend within a receptacle of the first floor of the modular cargo structure upon extension of the handle.

2. The cargo loading system of claim 1, further comprising a collar coupled to the handling member and to the drive unit.

3. The cargo loading system of claim 2, wherein the collar is configured to secure the first floor of the modular cargo structure to the drive unit via the handling member.

4. The cargo loading system of claim 1, wherein the handle of the plunger lock pin device is coupled to an arm, and wherein the arm is coupled to a bar of an actuator, the actuator configured to automatically secure the first floor of the modular cargo structure to the interior of the aircraft with the plunger lock pin device by moving the actuator bar causing the handle of the plunger lock pin device to extend and the pin to extend within the receptacle of the first floor of the modular cargo structure.

5. The cargo loading system of claim 4, wherein the plunger lock pin device includes a pin that is configured to extend within a receptacle of the first floor of the modular cargo structure wherein the pin is configured to retract from the receptacle of the first floor of the modular cargo structure upon retractions of the handle.

6. The cargo loading system of claim 4, wherein the handle has a first end and a second end opposite the first end;
   wherein the arm has a first end and a second end opposite the first end;
   wherein the second of the handle is coupled to the first end of the arm; and
   wherein the second end of the arm is coupled to the actuation bar.

7. The cargo loading system of claim 1, further comprising a clutch in contact with the drive unit.

8. The cargo loading system of claim 7, wherein the clutch is configured to disengage the driver from the drive unit in response to a failure condition during loading of the modular cargo structure into the aircraft, during unloading of the modular cargo structure from the aircraft, or both.

9. The cargo loading system of claim 1, wherein the rotation device is in contact with the drive unit at the first end of the cargo area.

10. The cargo loading system of claim 9, further comprising a non-driven rotation device in contact with the drive unit at the second end of the cargo area.

11. The cargo loading system of claim 1, wherein the plurality of floors are connected to each other by a plurality of couplers at an end of each of the plurality of floors.

12. The cargo loading system of claim 1, wherein each of the plurality of floors comprises a plurality of receptacles for receiving a structure of the aircraft.

13. The cargo loading system of claim 1, wherein the plurality of modular floors have a daisy chained configuration.

14. The cargo loading system of claim 13, wherein the plurality of floors are loaded into the aircraft consecutively.

15. He cargo loading system of claim 1, further comprising an extension pier of the aircraft, wherein the drive unit extends along a length of the extension pier.

16. The cargo loading system of claim 15, wherein the extension pier includes at least one joint configured to enable retraction of the extension pier.

17. A method of cargo loading of an aircraft, the method comprising:
   activating a driver of a cargo loading system, the cargo loading system including a drive unit extending along a length of a cargo area of an aircraft, the cargo area having a first end and a second end, the first end being near a nose of the aircraft and the second end being near a tail of the aircraft, the drive unit removably coupled to a first floor of a plurality of floors in a modular cargo structure via a handling member;
   using the driver, applying torque to a rotation device of the cargo loading system to cause the drive unit to move the modular cargo structure within the aircraft;
   receiving, within the aircraft via the drive unit, one or more cargo items coupled to the modular cargo structure; and
   securing the first floor of the plurality of floors to an interior of the aircraft using a plunger lock pin device having a first end and a second end opposite the first end, the first end comprising a pin and the second end comprising a handle, wherein securing the first floor of the plurality of floors comprises:
   extending the pin within a receptacle of the first floor of the modular cargo structure upon extension of the handle.

18. The method of claim 17, further comprising automatically securing the first floor of the modular cargo structure to the interior of the aircraft using the plunger lock pin device by moving an actuator bar that causes the handle of the plunger lock pin device to extend and therefore the pin to extend within the receptacle of the first floor of the modular cargo structure.

19. A method of unloading cargo from an aircraft, the method comprising:
   activating a driver of a cargo loading system, the cargo loading system including a drive unit extending along a length of a cargo area of an aircraft, the cargo area having a first end and a second end, the first end being near a tail of the aircraft and the second end being near a nose of the aircraft, the drive unit removably coupled to a first floor of a plurality of floors in a modular cargo structure via a handling member;
   using the driver, applying torque to a rotation device of the cargo loading system to cause the drive unit to move the modular cargo structure within the aircraft;
   providing, from the aircraft to a cargo platform via the drive unit, one or more cargo items coupled to the modular cargo structure; and
   and after the one or more cargo items are loaded inside the aircraft, securing at least the first floor of the plurality of floors to an interior of the aircraft using a plunger lock pin device having a first end and a second end opposite the first end, the first end comprising a pin and the second end comprising a handle, wherein securing at least the first floor of the plurality of floors comprises:
   extending the pin within a receptacle of the first floor of the modular cargo structure upon extension of the handle.

20. The method of claim 19, further comprising unlocking the modular cargo structure from the aircraft via the plunger lock pin device by retracting the pin from the receptacle of the first floor of the modular cargo structure upon retracting the handle.

* * * * *

UNITED STATES PATENT AND TRADEMARK OFFICE
CERTIFICATE OF CORRECTION

| | | |
|---|---|---|
| PATENT NO. | : 11,667,385 B2 | |
| APPLICATION NO. | : 16/238047 | |
| DATED | : June 6, 2023 | |
| INVENTOR(S) | : James Philip Dobberfuhl and Max Urban Kismarton | |

It is certified that error appears in the above-identified patent and that said Letters Patent is hereby corrected as shown below:

In the Claims

At Column 17, Line 18, "He cargo loading system" should be --The cargo loading system--;

At Column 18, Line 28, "and after the one or more" should be --after the one or more--.

Signed and Sealed this
Nineteenth Day of March, 2024

Katherine Kelly Vidal
Director of the United States Patent and Trademark Office